United States Patent [19]

Sasuta et al.

[11] Patent Number: 4,698,805
[45] Date of Patent: Oct. 6, 1987

[54] CONSOLE INTERFACE FOR A TRUNKED RADIO SYSTEM

[75] Inventors: Michael D. Sasuta, Palatine; Lewis H. Rosenthal, Buffalo Grove; Donald C. Mills, Glenview; Russell A. Marten, Schaumburg; David J. Kizior, Hoffman Estates; Arun Sobti, Wheaton, all of Ill.; Johnny E. Blankenship, Parker, Colo.

[73] Assignee: Motorola, Inc., Schaumburg, Ill.

[21] Appl. No.: 775,908

[22] Filed: Sep. 13, 1985

[51] Int. Cl.⁴ ........................... H04B 3/36; H04B 7/14
[52] U.S. Cl. ......................................... 370/97; 455/17
[58] Field of Search ............... 370/85, 97, 95; 455/33, 455/56, 17; 179/170 R; 379/338, 339

[56] References Cited

U.S. PATENT DOCUMENTS

| | | |
|---|---|---|
| 3,928,804 | 12/1975 | Schmidt et al. ........................ 455/17 |
| 4,012,597 | 4/1977 | Lynk, Jr. et al. ................. 179/41 A |
| 4,553,262 | 11/1985 | Coe ........................................ 455/17 |
| 4,578,815 | 3/1986 | Persinotti .............................. 455/17 |

Primary Examiner—Douglas W. Olms
Assistant Examiner—Frank M. Scutch, III
Attorney, Agent, or Firm—Thomas G. Berry; Donald B. Southard

[57] ABSTRACT

A console interface for a trunked communication system is disclosed wherein unique interface modules are coupled to the central controller and console network to establish communication therebetween. A console interface constructed and arranged to transceive trunking channel call information couples the dispatcher console to the console network thereby allowing the dispatcher to interact with the trunked system.

10 Claims, 27 Drawing Figures

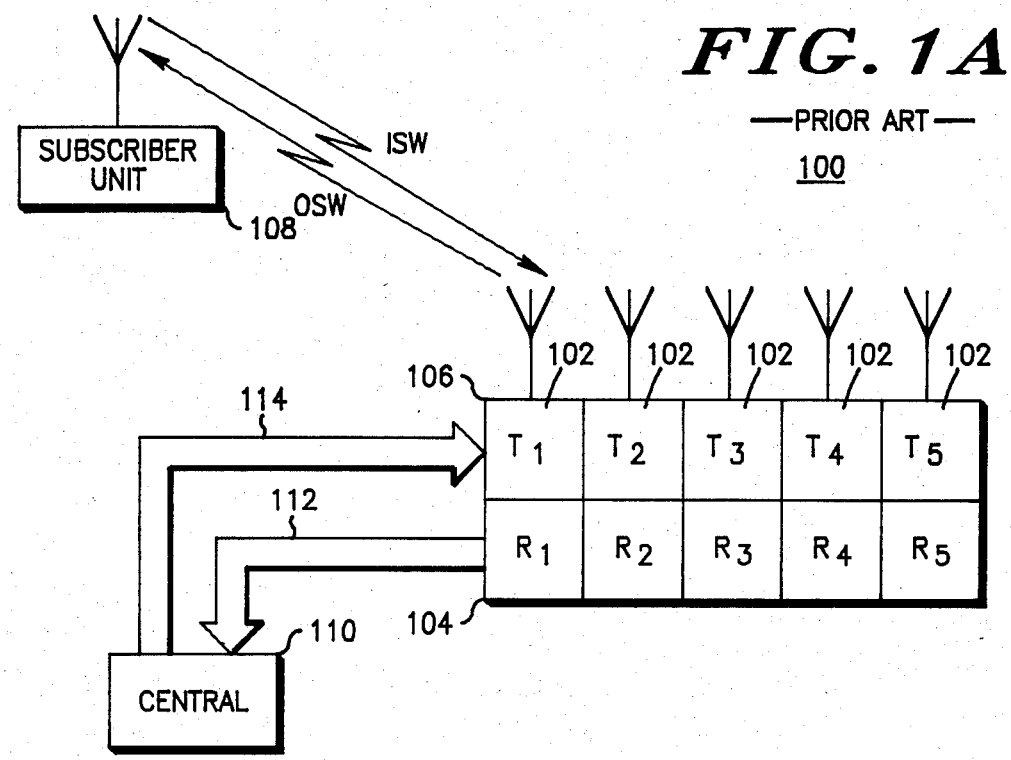
FIG. 1A
—PRIOR ART—
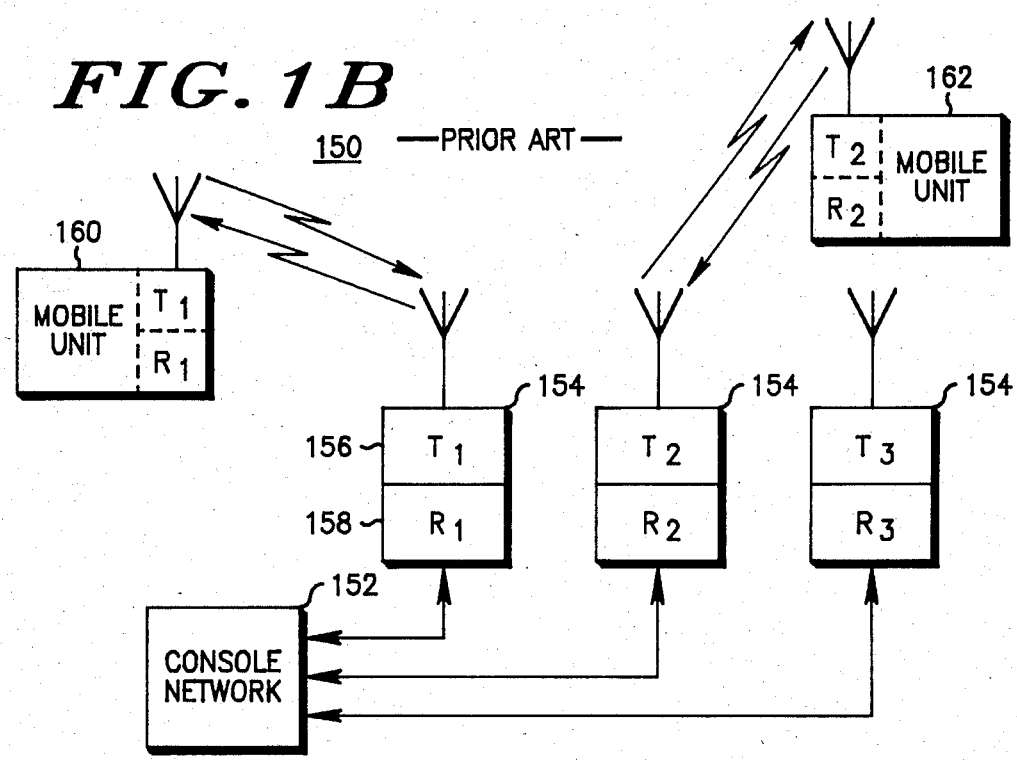
FIG. 1B —PRIOR ART—

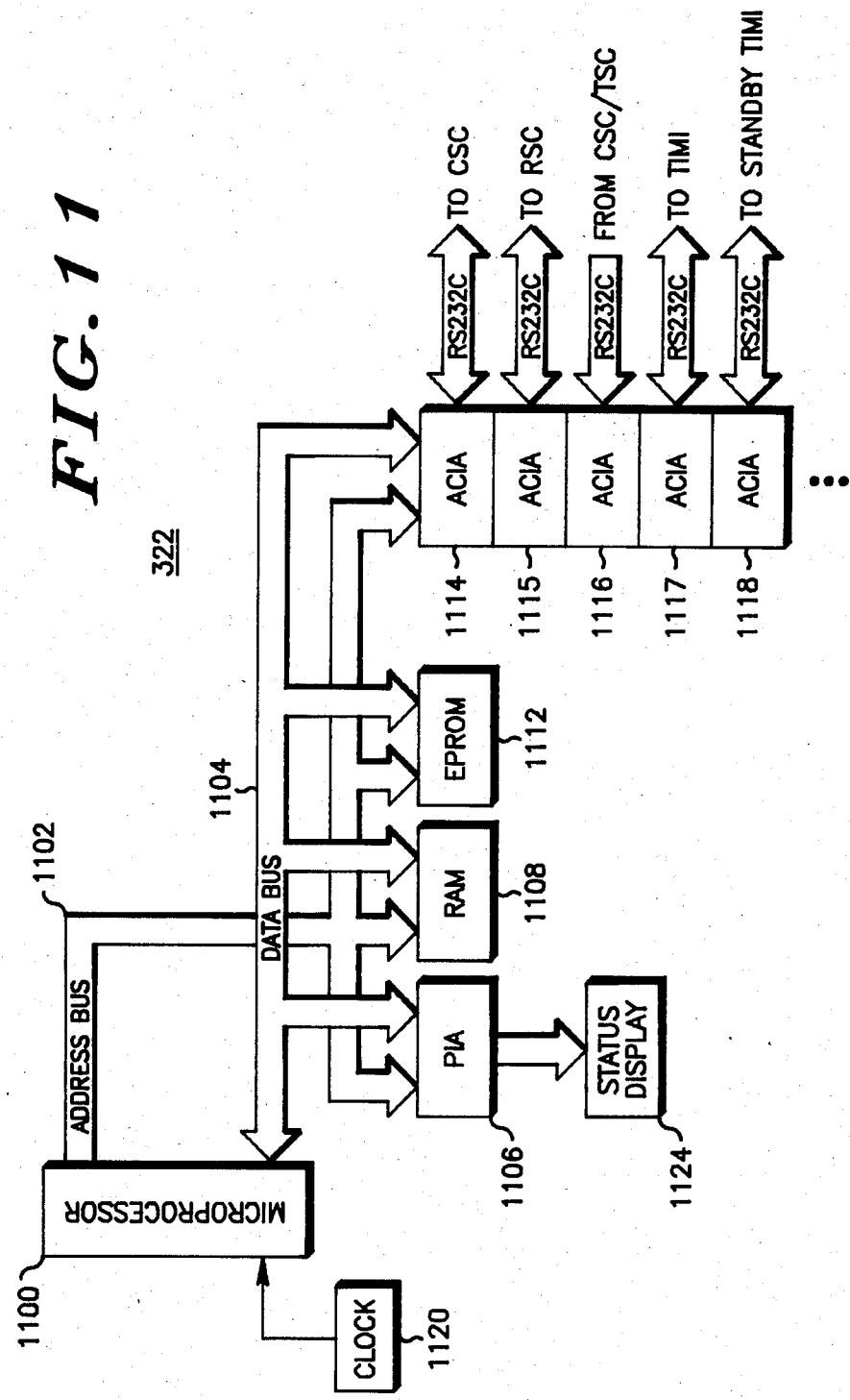

CONSOLE INTERFACE FOR A TRUNKED RADIO SYSTEM

BACKGROUND OF THE INVENTION

This invention relates generally to trunked radio communication systems and conventional dispatch radio systems and is more particularly directed to an interface circuit for interfacing a console to a trunked radio system.

Trunked radio systems have developed as a means of providing increased mobile unit capacity in systems which operate in a fixed geographic area. Trunked communication systems employ the sharing of a limited number of communication channels (repeaters) with a large number of subscriber units. Accordingly, no repeater is dedicated to the sole use of a specific subscriber unit or group of units. The channel resources are dynamically allocated to satisfy the current communication demands of the subscriber units. Typically, a subscriber unit is a mobile vehicle such as a taxicab, construction company, or individuals who desire vehicular communication. In many of these situations, it is desirable to have a home or base dispatcher communicate with the several mobile units in the field. However, prior art systems have treated the dispatcher as simply another subscriber unit. Accordingly, once a call was established, the dispatcher could not be assured of being heard over the other subscribers units. Thus, prior art trunked systems suffered a severe disadvantage which limited their utility in several public service applications since dispatcher takeover capability could not be guaranteed.

Control consoles have been interfaced to conventional channel communication systems in the past. In a conventional channel system, each unit is constrained to operate only on a predetermined channel. Accordingly, since communication with a particular unit could only take place through a predetermined repeater, the console was typically hard-wired to the repeaters to control all of its functions. Thus, the console operator, when selecting a group with which to communicate, controls the function of the repeater on which the group resides. The conventional channel communication systems, as compared to a trunked communication system, suffers the detriment of being spectrally inefficient since the channel remains idle unless a particular unit is communicating during any particular time. Further, the capacity of a particular group may be limited, in that, since all units are required to remain on same channel, if a first group grows to exceed the capacity of the channel, the units are not easily transferred to a second channel to spread the communication demand across the available channels. Therefore, while trunked systems suffer the detriment of lacking full console control, they are more spectrally efficient and more easily accommodate the dynamically varying communication channel demands of its subscriber units.

The present invention combines the advantages of console control with that of trunked radio systems. A unique interface and signalling protocol provide communications between a console which is constructed and arranged to provide the trunking data information, on a time division multiplexed arrangement, between several dispatchers. Thus, an improved trunked communication system is afforded by the present invention providing increased flexibility and utility in several communication markets.

SUMMARY OF THE INVENTION

According, it is an object of the present invention to provide an improved trunked communication system.

It is another object of the present invention to combine the advantages of a trunked communication system with the advantages of a conventional console controlled communication system.

It is a further object of the present invention to provide an interface for a trunked communication system and a console network.

These and other objects are achieved in the present console interface for a trunked radio system.

In practicing the invention, unique interface modules are coupled to the central controller and console network to establish communication therebetween. A console interface constructed and arranged to transceive trunking channel call information couples the dispatcher console to the console network thereby allowing the dispatcher to interact with the trunked system.

BRIEF DESCRIPTION OF THE DRAWINGS

The features of the present invention which are believed to be novel are set forth with particularity in the appended claims. The invention, together with further objects and advantages thereof, may be understood by reference to the following description taken in conjunction with the accompanying drawings, and the several figures of which like referenced numerals identify like elements, and in which:

FIG. 1a is a block diagram of a typical trunked communication system;

FIG. 1b is a block diagram of a typical conventional communication system;

FIG. 5 is a flow diagram illustrating the steps executed to transmit the communication block of FIG. 4a;

FIGS. 6a-c are flow diagrams illustrating the steps executed to receive the communication block of FIG. 4a;

FIG. 11 is a block diagram of the TCI of FIG. 3;

DESCRIPTION OF THE PRIOR ART

Figure 2:
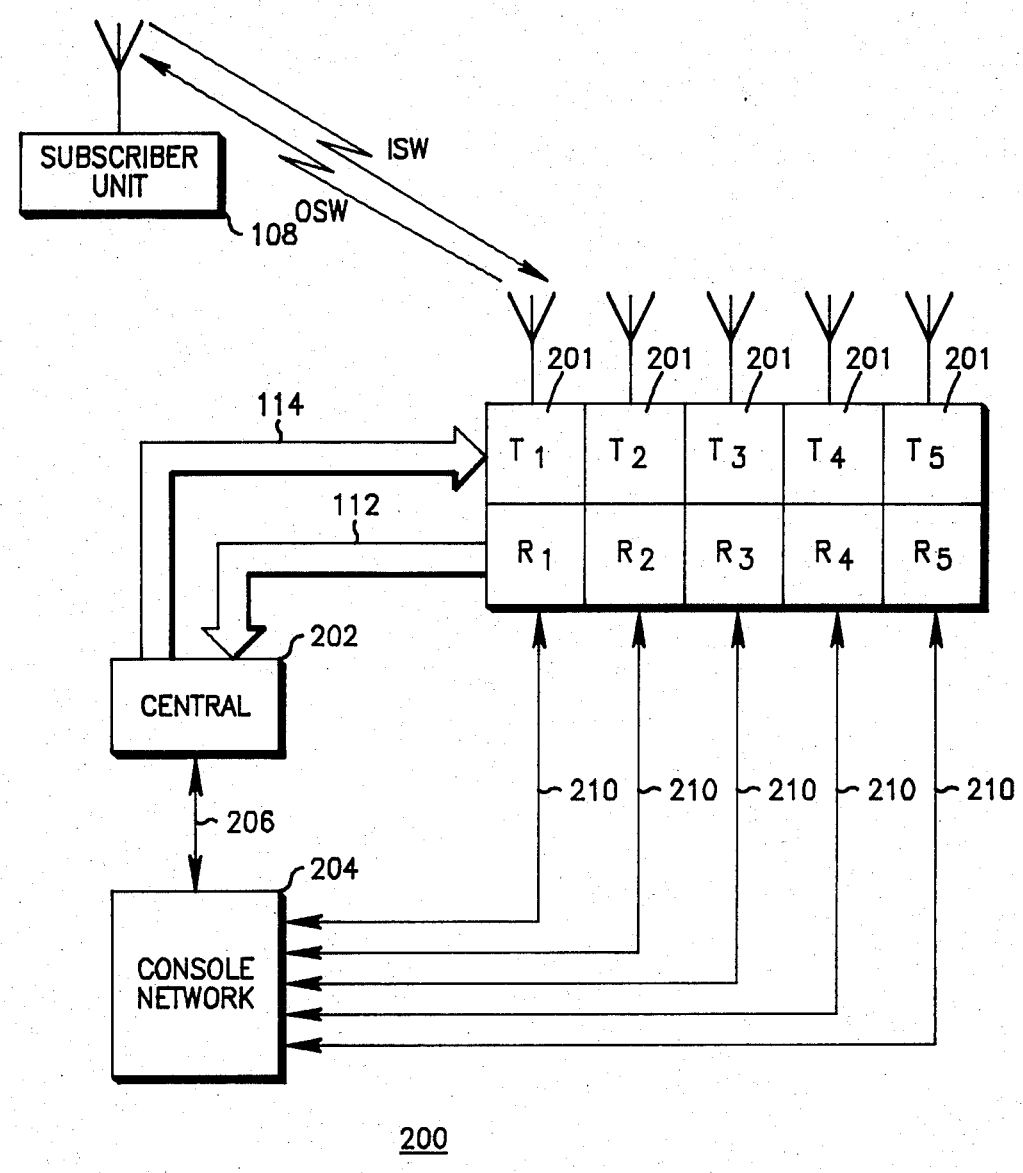
FIG. 2 is a block diagram of the improved trunked communication system according to the present invention.

FIG. 1a is a block diagram of a trunked radio system 100 consisting of a plurality of trunked repeaters 102, each having a receiver section 104 and a transmitter section 106, a plurality of subscriber units 108 (one shown), which may be either mobile or portable units, and a trunked central controller 110. The trunked central controller 110 is coupled to the plurality of repeaters 102 via a receive data bus 112 and a transmit data bus 114. The central 110 communicates with the plurality of subscriber units 108 on a selected one of the trunked repeaters 102 which operates as a control channel. The remainder of the plurality of trunked repeaters 102 are available as assignable voice channels. In the quiescent state, all subscriber units 108 monitor the outbound frequency of the selected trunked repeater which is designated as the control channel.

To establish a dispatch call between a group of units operating on the trunked system, a subscriber unit 108 sends a data packet called an "inbound signalling word" (ISW). The ISW contains the requesting units unique ID code, consisting of a group ID, an individual ID, and a subgroup code indicating the group of units the requester wishes to communicate with. The ISW also contains a unique call type code which indicates that a dispatch call is the type of call desired. The request is forwarded to the central controller 110 which decodes the request and transmits a data packet called an "outbound signalling word" (OSW) to all subscriber units which are monitoring the outbound control channel. The OSW is a channel grant which contains the subgroup code, the requesting units ID code, and the voice channel assigned for the conversation. The OSW causes the requesting unit to move to the voice channel and commence transmitting, and causes all the subscriber units with matching group or subgroup ID's to move to the voice channel as listening units. In this way, a group or subgroup conversation is set up. If all the voice channels are in use, the central controller 110 sends the requesting subscriber unit 108 a "busy OSW".

A dispatcher establishes a call in the same manner as the subscriber unit described hereinabove. Thus, if all channels are in use, the dispatcher would receive a "Busy OSW" and have to wait for an available channel. Further, if the call initiated by a subscriber was an individual call (i.e., not a group or subgroup call) the dispatcher would not monitor the conversation since the dispatcher was not addressed as a listening unit.

Referring now to FIG. 1b, there is shown a conventional channel communication system consisting of a console network 152, which may have one or more dispatcher positions, a plurality of base units 154, each having a transmitting section 156 and a receiving section 158. The conventional communication system 150 may also have a plurality of mobile units 160 and 162, which communicate with the console 152 over predetermined communication channels. For example, mobile unit 160 communicates with the console 152 through the base unit 154 which have similarly assigned transmit and receive frequencies. In a similar manner, mobile unit 162 may communicate with the console 152 through the base unit having like frequency assignments. In a conventional channel communication system, it is not possible for mobile unit 160 to communicate through any other base unit having a different transmit and frequency assignment without being retuned at a field service station.

DETAILED DESCRIPTION OF THE PREFERRED EMBODIMENT

Referring now to FIG. 2, there is shown the improved trunk communication system 200 as contemplated by the present invention. The trunked communication system 200 is comprised of a plurality of trunked repeaters 201 each having circuitry to defeat local repeater operation, a plurality of subscriber units 108, a central controller 202 and a console network 204. The central controller 202 is coupled to the plurality of trunked repeaters 201 via a receive data bus 112 and a transmit data bus 114. Further, the central controller 202 is coupled via a communication link 206 to the console 204. The communication link 206 may be any suitable communication channel for the bi-directional transfer of information. In the preferred embodiment, the link 206 is an industry standard RS232C communication link. Of course, communication link 206 can be direct wired if the distance is appropriately short, or can be coupled remotely via modems using standard phone lines or microwave channels. The console network 204 is also coupled to each of the trunked repeaters 201 through a communication link 210 which communicates analog audio voice information and control tones to and from the trunked repeaters.

A dispatch call, initiated by a subscriber unit 108, is performed exactly as previously described hereinabove. However, the central 202 also transmits information to the console network 204 via the communication channel 206, which enables a console dispatcher to monitor the conversation. For a dispatcher initiated call, the console network 204 communicates with the central via the link 206 to obtain a channel on which to communicate. However, the console network 204 of the present invention can transmit a plurality of other messages to the central 202 to take over any voice channel or other system functions.

Figure 3:
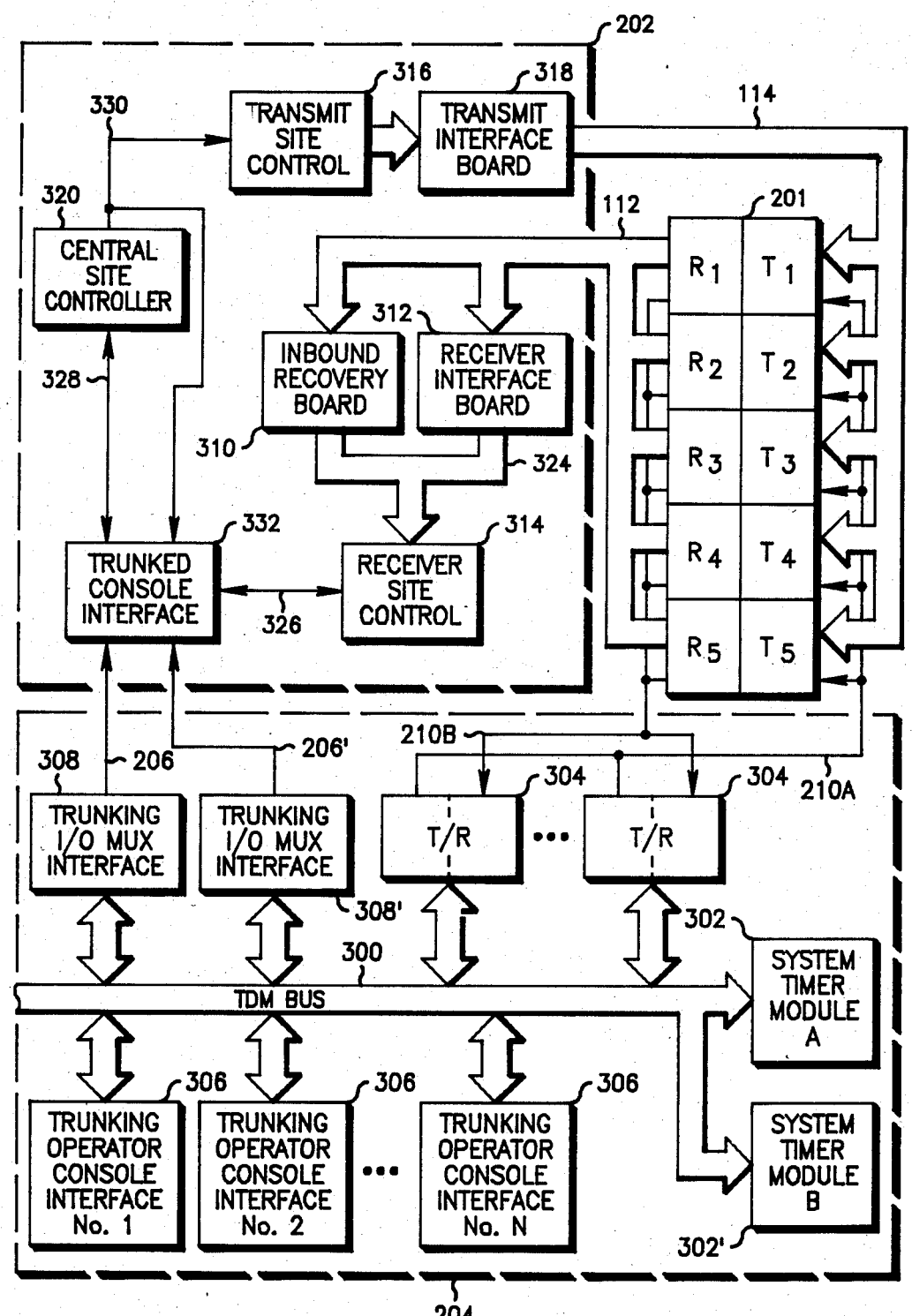
FIG. 3 is a detailed block diagram illustrating the present invention.

Referring now to FIG. 3, there is shown a block diagram of the trunked communication system according to the present invention which highlights the internal organization of the central controller 202 and the console network 204. The console network 204 is comprised of a common time division multiplex (TDM) data bus 300 which enables communications between all other modules in the console network. The modules include the system timer modules (STM) 302 and 302'. The STM 302 and 302' are identical in construction so that one may serve as a backup for the module in service. This architecture provides protection against a "single point failure" rendering the system inoperative. Also coupled to the TDM bus 300 are a plurality of transmit-receive (T/R) modules 304. Each of the T/R modules 304 are coupled to one of the trunked repeaters 201 via link 210a (for transmit) and 210b (for receive). The T/R module converts the audio information obtained from a trunked repeaters 201 to digital information arranged in a suitable data stream so that it may be communicated by the TDM bus 300. The TDM bus 300 and the aforementioned modules are more fully described and shown in Motorola Field Service Manual 68P81063E60-A entitled "Centracom Series II Control Center Systems", which is hereby incorporated by reference and obtainable from the Service Publications Department of Motorola, Inc., 1301 East Algonquin Road, Schaumburg, Ill., 60196. The console network 204 is further comprised of a plurality of trunked operator console multiplex interfaces (TOMI's) 306. Each TOMI 306 interfaces to a physical dispatcher console. Thus, a plurality of dispatchers may share the console network 204 and thus have access to the trunked system. The TOMI's transceive digital audio to and from the T/R modules. Received digital audio is reconverted into an analog signal for the dispatchers. To communicate with the central 202, the console network 204 also includes trunking I/O multiplex interfaces (TIMI) 308 and 308'. The TIMI 308' serves a backup interface similar in architecture to STM 302' so that a "single point failure" will not disable the trunked communication system. Either of the TIMI 308 or 308' communicates over the channel 206 (or 206') to the central controller 202.

Still referring to FIG. 3, the central controller 202 is comprised of an inbound recovery board (IRB) 310, one or more receiver interface boards (RIB) 312, a receiver site controller (RSC) 314, a transmit site controller (TSC) 316, a transmit interface board (TIB) 318, and a central site controller (CSC) 320. The above mentioned modules are shown and more fully described in Motorola Instruction Manual 68P81066E60-O, entitled "Trunked Radio System Central Controller", which is hereby incorporated by reference and available from the Service Publications Department of Motorola, Inc., 1301 East Algonquin Road, Schaumburg, Ill., 60196.

The central controller 202 also includes a trunked console interface (TCI) 322 which is disposed between the RSC 314 and the CSC 320. In prior trunked communications systems, the RSC 314 was coupled directly to the CSC 320 to communicate received ISW's and channel information from the subscriber units. The present invention disposes the TCI 322 between the RSC 314 and the CSC 320. The TCI is constructed and arranged so that each of the RSC 314 and the CSC 320 modules "sees" the equivalent electrical characteristics (i.e., impedance and logic levels) as they would in the prior systems. This is important as it allows prior trunked systems to be field retrofitted to obtain the benefits of the present invention. Therefore, the TCI 322, the TIMI 308 (and 308') are essential to the present invention since they define the interface allowing the transceiving of trunking data. Of course, it is also essential that the TOMI's 306 be capable of generating an appropriate trunked data packet so that the central controller 202 may understand the various requests and commands.

A more complete understanding of the operation of the improved trunked system of FIG. 3 may be obtained by the following illustrations of call handling.

SUBSCRIBER INITIATED CALL

A subscriber call is initiated when a subscribing unit 108 transmits an ISW over the selected one of the plurality of trunked repeaters 201 acting as the control channel. The ISW is forwarded via receive data bus 112 to the IRB 310. The ISW is communicated via a data-/address bus 324 to the RSC 314. The RSC passes the ISW to the TCI 322 over a serial link 326 such as a conventional RS 232C serial interface or functional equivalent. The TCI, in turn, passes the ISW to the CSC 320 over another serial link 328. The CSC decodes the ISW and assigns an appropriate available channel to satisfy the call request. The CSC 320 then sends the receiver channel assignment to the TCI 322 over serial link 328 and sends a "grant OSW" to the TSC 316 over serial link 330. The TSC 316 passes the grand OSW to the TIB 318, which in turn transmits the OSW over the trunked repeater operating as the control channel to the requesting subscriber unit so that he may go to the assigned channel and begin transmitting, and to either an individual, group or subgroup of other subscriber units so that they may go to the assigned channel as listening units. The TCI 322 also monitors the serial link 330 between the CSC 320 and the TSC 316. The TCI 322, having previously received the channel assignments from the CSC 320, monitors the serial link 330 for the transmission of the grant OSW, which triggers the TCI to process the channel assignment information and communicate via the serial link 206 the grant assignment to the TIMI 308. The TIMI 308 operates on the channel grant assignment verifying ID codes and other parameters and formats the assignments into the protocol used on the TDM bus 300. The information is then placed on the TDM bus to be received by the appropriate TOMI 306 that will unmute the speaker so that the dispatcher can monitor and participate in the call. When the subscriber unit ends the transmission, the central informs the console via the interface established by the TCI 322 and the TIMI 308 thereby enabling the TOMI to mute the audio and indicate that the subscriber activity has ceased.

DISPATCHER INITIATED CALL

A dispatcher call is initiated when the dispatcher selects the group, subgroup or individual that he wishes to communicate with and presses his push-to-talk (PTT) switch. The TOMI 306 communicates the PTT request via the TDM bus 300 to the TIMI 308. The TIMI 308 reformats the PTT request into the proper protocol for transmission across serial link 206 to the TCI 322. The TCI 322 validates the PTT request checking to determine if the desired group, subgroup, or individual is currently busy. Assuming that the desired subscriber unit or units is not busy, the TCI 322 formats the appropriate ISW and sends it via serial link 328 to the CSC 320. The CSC 320 operates in the same manner as described hereinabove and sends the appropriate OSW via TSC 316 and TIB 318 to instruct the appropriate subscriber units to go to communication channel as listening units. The TCI 322 also sends the grant OSW to the TIMI 308 via the serial link 206. The TIMI 308 reformats the grant OSW to communicate via the TDM bus 300 to the requesting TOMI. The requesting TOMI then instructs the assigned T/R to disable the local repeat function the assigned repeater (which is keyed by the CSC 320) via a TDM data packet. The dispatcher may then begin transmission. The transmit and receive audio travels via the TDM bus 300, through an assigned T/R 304 and the assigned trunking repeater 201 via connection 210 a-b. At the end of the transmission, the TOMI 306 communicates an end-of-transmission data packet to the TIMI, which then informs the CSC 320 via the serial link 206 that the transmission has ended. The subscriber units then resume monitoring the control channel to await new call activity.

DISPATCHER TAKEOVER

Assuming that a subscriber unit has initiated a call as described hereinabove, the dispatcher may be monitoring the call via a audio link 210b and a T/R module 304. A dispatcher has the capability of overriding the normal "local repeat" function of the trunking repeaters 201. As used herein, the term local repeat means that any audio signal received in a receiver 104 of a repeater 201 is locally transmitted via transmitter 106. When the dispatcher activates the PTT switch, he executes a disable function via a T/R module 304 and audio link 210a. A predetermined control tone received by the assigned repeater will cause the repeater to cease transmitting the received signals. However, the received audio signals will still be applied to the dispatcher position for monitoring. The transmitter circuitry 106 of the repeater 201 will not transmit the audio initiated by the dispatcher through the TOMI 306, via the TDM bus 300, to a T/R module 304. The subscriber units will now hear the dispatcher's message in place of any other subscriber unit audio. The takeover condition will last for the duration of the call activity by the dispatcher. When the PTT switch is released, the repeater 201 will revert to the normal local repeat operation. Alternately the dispatch may lock the disable to prevent all subscriber-to-subscriber communication.

Figure 4A:
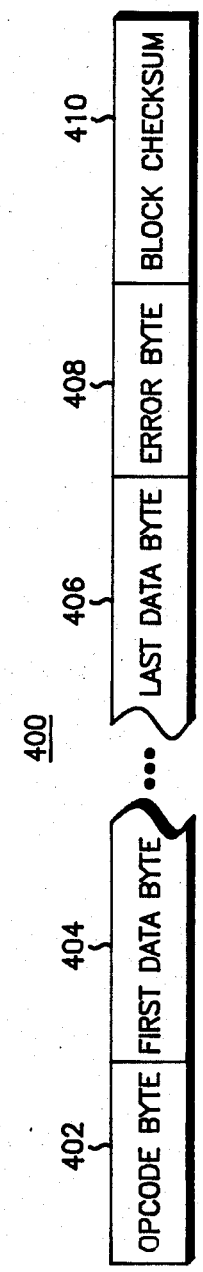
FIGS. 4a-b are illustrations of the preferred signalling formats in accordance with the present invention.

Referring now to FIG. 4a, there is illustrated the preferred data format for the serial link 206. An information block 400 communicated across the serial link 206 is comprised of a plurality of byte's. Those skilled in the art will appreciate that a byte is typically defined as eight digital bits. Thus, a byte can represent 256 different possible logic states. The first byte in the block 400, is the opcode byte 402. The opcode byte determines the size of the block 400. Each valid opcode byte is associated with a specific number of bytes for the block size. The opcode byte also determines how the block of data will be used after block transfer reception and validation. In the preferred embodiment, the valid opcodes are stored in a table residing in the memory of any module authorized to initiate communications. Following the opcide byte is the first data byte 404. The actual number of data bytes will vary depending upon the opcode, which will define the amount of information required to execute a particular function. Thus, the data field is of variable size ending with a last data byte 406. Following the last data byte is the error byte 408. The error byte operates to detect link errors which completely mask one or more block transfers. The TCI 322 and the TIMI 308 (and 308') tracks the current block sequence number that it has transmitted, as well as the sequence number expected from the other module for the next block transfer. Thus, the error byte is divided into two four bit segments. The most significant four bits contains a sequence number of the last validity received block. Thus, if a module receives another block who's number is not a unitary increment of the last validity receive block, the module knows that one or more complete blocks have been missed. The receiving module may then request that the communications starting from the last validity receive block be repeated thereby providing a redundancy mechanism to ensure the reception of data. The lower four bits of the error byte 408 contains the sequence number of the current block being transmitted. This enables the receiving part to check its last error byte to guarantee that one or more block transfers have not been missed. A block transfer ends with the block checksum byte 410. The block transfer is validated using the block checksum to determine if a "byte error" (as opposed to completely missing a block) has occurred during the transfer. The source module of the block will compute the block checksum across the block by exclusive ORing all the bytes of the block together, and using the result as the block checksum. The receiving module will reverse the checksum process by computing the block checksum across all the received bytes of the block, and compare it to the received block checksum. Only when the checksum bytes match is the block determined validated. After the block is validated, the error byte information is processed. The receiving unit updates the last block validity received in the error byte 408 thereby maintaining a history of the communications between the TCI 322 and the TIMI 308.

Figure 4B:
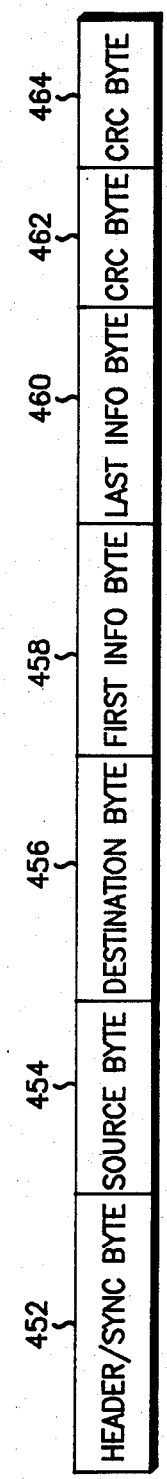

Referring now to FIG. 4b, the configuration of the data format on the TDM bus is shown in detail. The data format illustrated in FIG. 4b is used by all modules which communicate via the TDM bus 300. A data message comprises a header/sync byte 452 which is used to mark the beginning of a communication. Following the header, is the source byte 454 which defines the ID code of the module initiating the communication. The third byte is the destination byte 456 which contains the ID code of the module who is to receive the information from the TDM bus 300. Following the destination byte 456 is the first information byte 458. The information field may be comprised of a plurality of information bytes but is fixed in length. The last information byte 460 is received just prior to the cyclic redundant check (CRC) bytes 462 and 464. The CRC bytes are used to validate the communcation 450 to ensure error free reception. In the event that an error is detected, the destination module will discard the received data.

Figure 5:
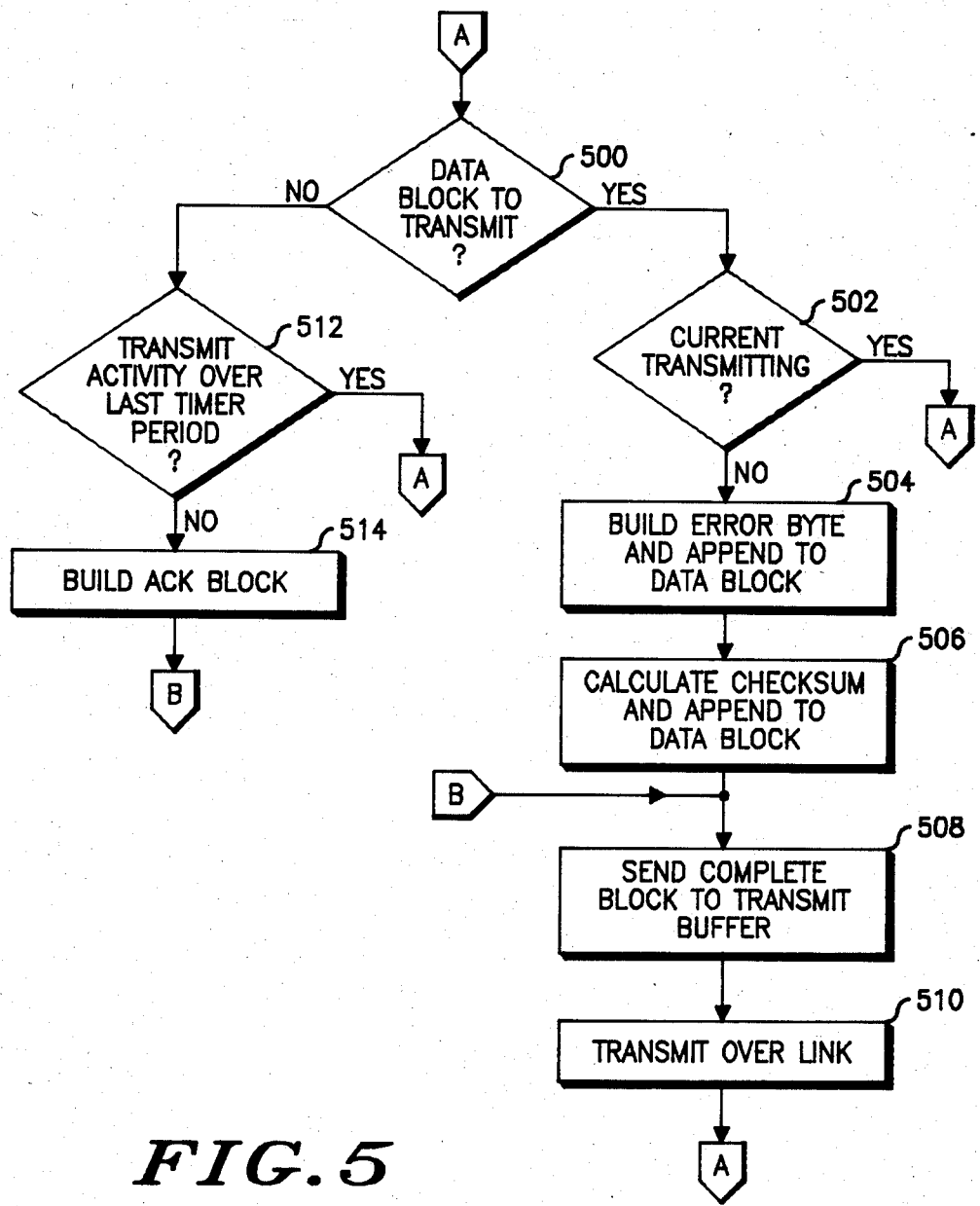

Referring now to FIG. 5 there is shown a flow diagram of the preferred method to construct a communication block 400 and transmit the same over the serial link 206. The routine begins in decision 500 which determines whether there is a data block to be transmitted. As previously mentioned, the valid opcodes are stored in a table which also may contain a variable number of information bytes depending upo the opcode selected. Some opcodes, for example the ACK opcode are only one byte long. However, the ACK communication block still has the error byte and checksum byte appended to it. If decision 500 determines that there is data to be transmitted, the routine proceeds to decision 502 to determine whether the module (i.e., TCI or TIMI) is currently transmitting over the serial link 206. If communication is currently in progress, decision 502 exists to reference letter A to wait until transmitting activity has stopped. If the module is not transmitting, decision 502 exists to item 504 where the error byte is built and appended to the data block. As previous mentioned in conjunction with FIG. 4, the error byte consists of two 4-bit portions. The most significant 4-bits contain the sequence number of the last validity received block, which is taken from a history table contained in a memory field within the module. Also extracted from the communication history table is the sequence number of the last block transmitted. This number is incremented by one and used as the last 4-bits of the error byte. After construction, the error byte is appended after the last information byte as more clearly illustrated in FIG. 4a. Next, the routine proceeds to item 506 where the checksum byte is calculated and appended to the data block after the error byte. As previously described, the checksum byte is calculated by exclusive ORing the other bytes in the block and using this number as the checksum byte. After the checksum byte is completed and appended, the block construction is completed and the block is sent, in item 508, to the transmit buffer to await communication. Once the communication block resides in the transmit buffer, it is transmitted over the data link, in item 510, after which the routine returns to reference numeral A to await the next transmission.

Still referring to FIG. 5, if decision 500 determines that there is nothing to be transmitted, the routine proceeds to decision 512 which investigates whether there has been any transmit activity over the last timer period. In the preferred embodiment of the present invention, a time-out-timer is established in each of the modules which communicate via the serial link 206. To ensure system reliability, there must be some communication activity (transmitting and receiving) during each timer period. If the determination of decision 512 is that there has been no communication activity over the last timer period, the routine proceeds to item 514 where an ACK block is built and sent (via reference letter B) to the transmit buffer. As previously described, the ACK communication block consists of an ACK opcode byte, the error byte and a checksum byte. Thus, the present invention contemplates sending an ACK communication block in the absence of communication activity to continually verify the integrity of the serial link 206. If a module determines that there has been no communication activity over a specified period, the module will determine that the serial link 206 is faulty. At that point, the modules (TCI and TIMI) will switch to the redundant link 206' (which is on hot standby). Both modules then check their error bytes to determine the last validity receive block in order to determine whether to retransmit one or more communication blocks to recover lost data. If, however, decision 512 determines that there has been communication activity over the last timer period, the timer is reset and the routine returns to reference A to await the next data block to be transmitted.

Figure 6A:
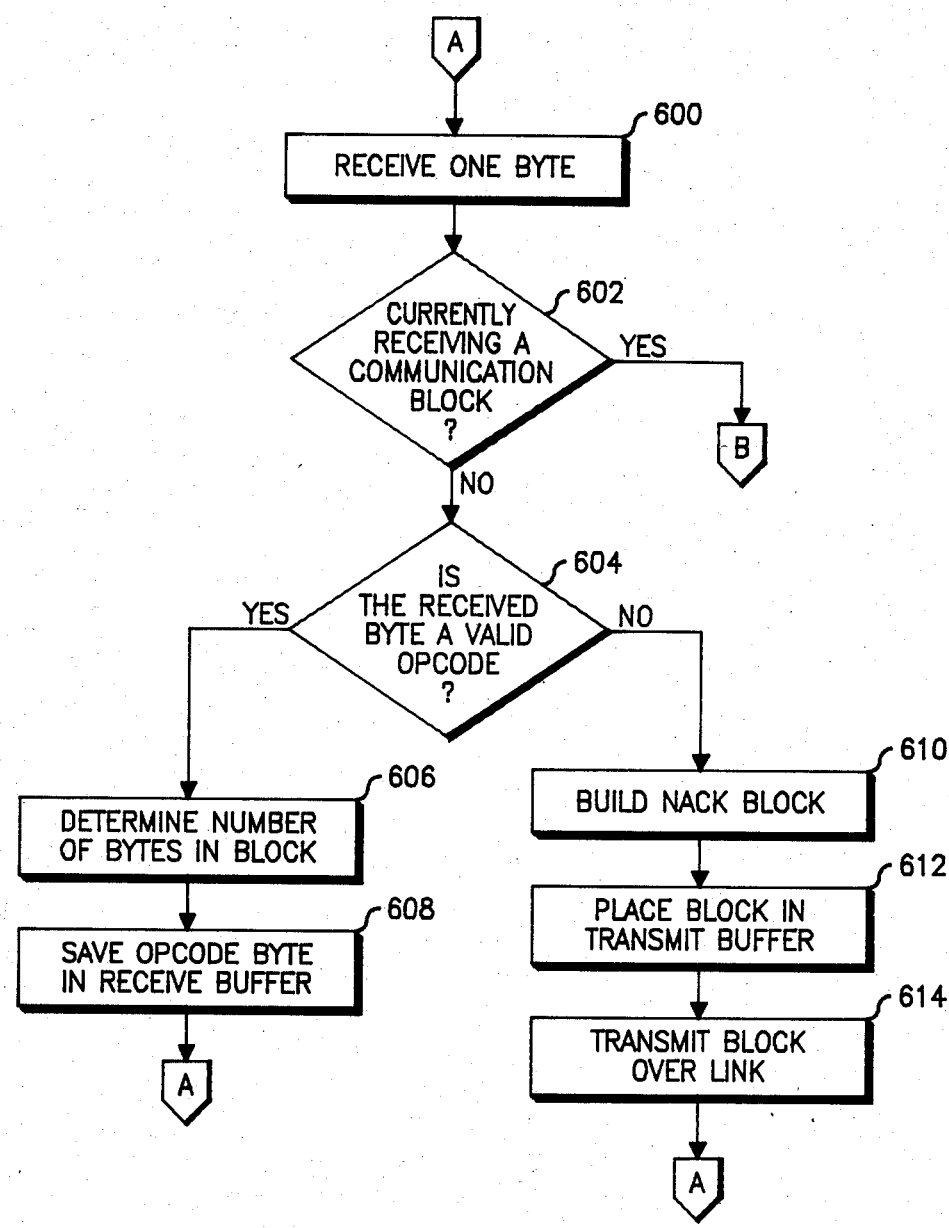
Figure 6B:
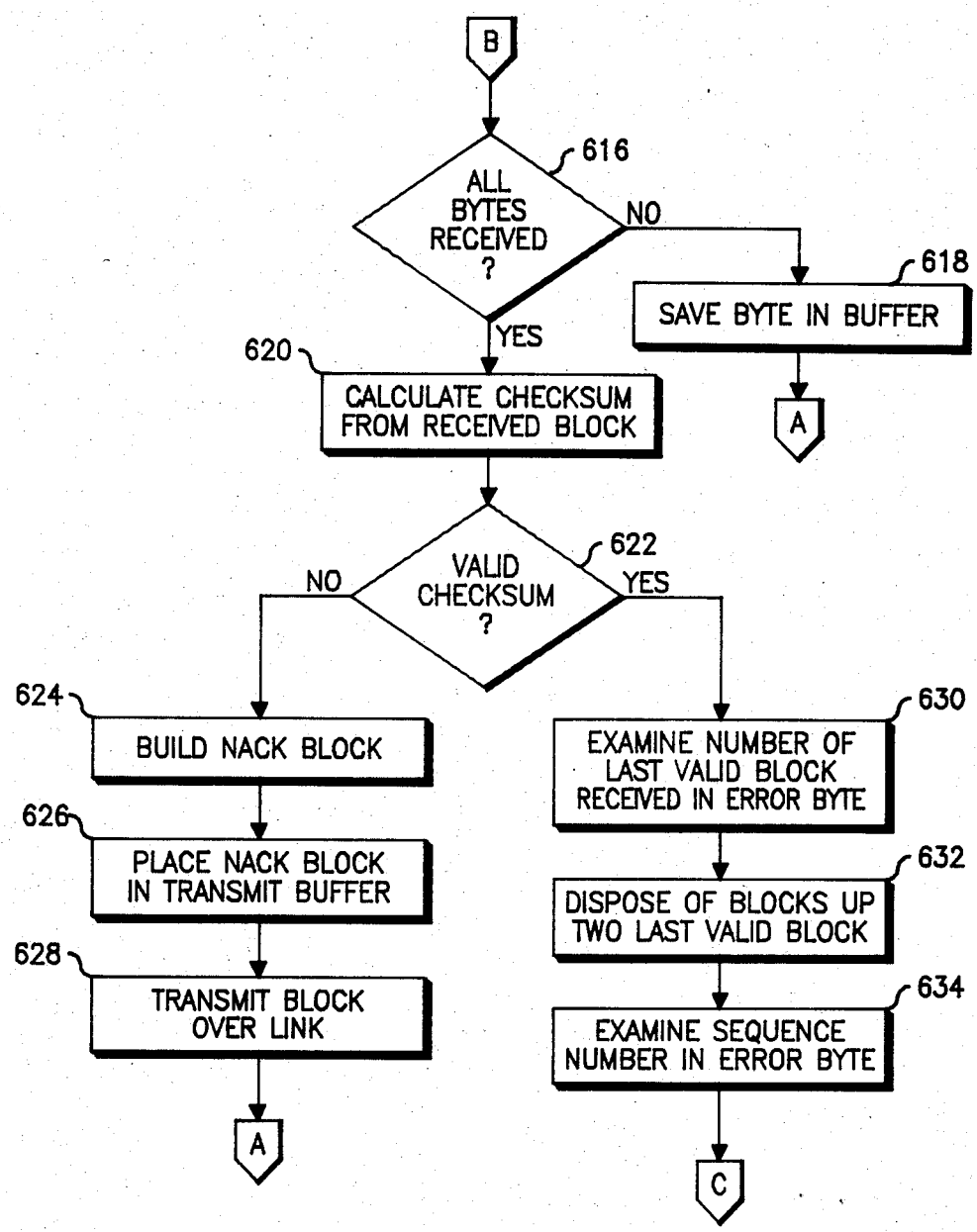
Figure 6C:
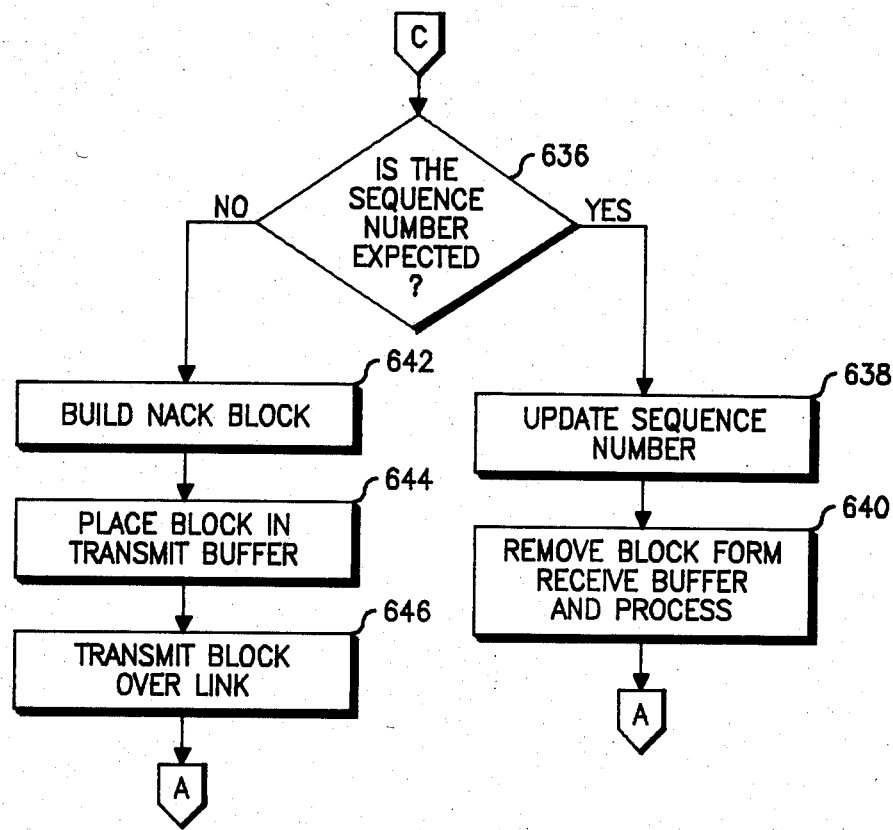

Referring now to FIGS. 6a-c there is shown a flow diagram illustrating the steps executed by the TCI 322 and the TIMI 308 when receiving a communication block from the serial link 206. The routine begins in item 600 where one byte is received from the serial link. Decision 602 determines whether the module is currently receiving a block transfer. If the module had previously recognized a valid opcode, the determination of decision 602 would be that it was currrently receiving a communication block and the routine would proceed to reference letter B. If, however, the module is not currently receiving a communication block, decision 602 proceeds to decision 604 to determine if this byte received is a valid opcode. If decision 604 determines that the byte is a valid opcode the routine proceeds to item 606 where the number of information bytes in the block will be determined by checking the opcode table. Of course, the actual number of bytes in the block will be two more than that stored in the opcode table since the error byte and checksum byte are appended. Following item 606, item 608 places the opcode byte received (in item 600) into a receive buffer to be saved until the entire communication block is received. The routine next proceeds to reference letter A where the next byte of the communication block is received again in item 600. If, however, decision 604 determines that the received byte is not a valid opcode, the routine proceeds to item 610 where a negative acknowledge (NACK) block is built. To reach item 610, the module would have received a byte in step 600, determined that it was not currently receiving a block, and the byte received is not a valid opcode. This would indicate that some problem existed in the link such that the module did not first receive the valid opcode and would therefore have no way of knowing where the information was to be used, or what kind of command (or request) it was. The NACK block consists of a single byte opcode and the error byte and checksum byte. Following item 610, the routine proceeds to item 612 where the NACK block is placed in the transmit buffer. Item &14 transmits the block across the link to the source module which will decode the NACK opcode and then use the error byte to determine what data must be repeated in order to complete data communications.

If decision 602 determines that the module is currently receiving the communication block, the routine proceeds to FIG. 6b where decision 616 first determines whether all the bytes of the communication block are received. If all the bytes have not been received, the current byte is placed in the receiver buffer (in item 618) and the routine returns to FIG. 6a where another byte is received in item 600. This loop will continue until all the bytes have been received and decision 616 exits to item 620, where the block checksum is calculated by exclusive ORing all the received bytes of the block. Decision 622 checks the calculated checksum against the received checksum byte to determine whether the block is valid. If the checksums do not match, item 624 builds a NACK block to inform the source module that the block was not validated. Item 626 places the block in the transmit buffer, which is transmitted in item 628. The routine then returns to reference letter A to await reception of the next byte. If decision 622 determines that the block is valid, the routine proceeds to item 630. In item 630, the error byte is examined by the source module to partially clear the history buffer of the receiving module. In item 632, all communication blocks up to the last validity received number are discarded to make room for future communication history. Accordingly, item 632 disposes of the blocks up to the last validity received communication block. The routine then proceeds to item 634 where the error byte is examined to determine the sequence number of this communication block. The routine then proceeds to reference letter C, which is illustrated in FIG. 6c. If decision 636 determines that the proper sequence number was received (meaning that there have been no lost checks) the routine proceeds to item 638 where the sequence number is updated. In item 640, the validated block is then removed from the receiver buffer and processed depending upon the instruction contained in the opcode byte. This completes a communication block reception, and accordingly, the routine proceeds to reference letter A of FIG. 6a to await the next communication transfer. However, if decision 636 determines that the sequence number is not expected, the routine proceeds to item 642, which builds an NACK block. Item 644 places the NACK block in the transmit buffer, which is transmitted over the serial link 206 in item 646. Thus, the NACK block is the signalling mechanism used to signal a source module that one or more blocks must be retransmitted to ensure the proper reception of the data.

Figure 7:
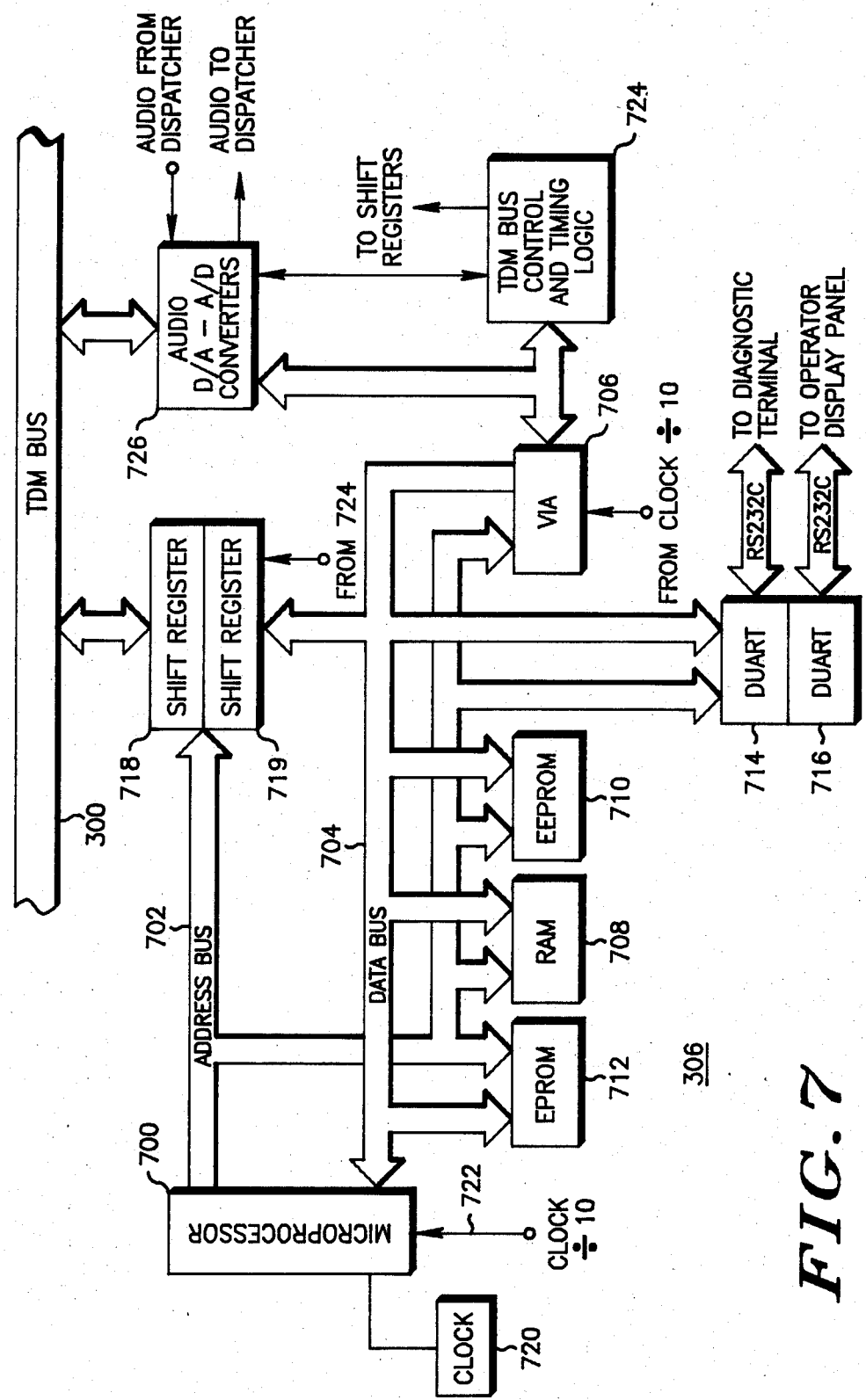
FIG. 7 is a block diagram of the TOMI of FIG. 3.

Referring now to FIG. 7, there is shown a block diagram of the TOMI 306 of FIG. 3. The TOMI module comprises a general purpose microprocessor which interfaces with a plurality of other components via an address bus 702 and a data bus 704. Microprocessor 700 may be any general purpose microprocessor such as a Motorola MC68000 available from Motorola, Inc. The address bus 702 couples the microprocessor 700 with a versatile interface adapter (VIA) 706, a random access memory (RAM) 708, an electronically erasable programmable read-only memory (EEPROM) 710, an erasable programmable read-only memory (EPROM) 712, and a dual universal asynchronous receiver/transmitter (DUART) having ports 714 and 716. The data bus 704 also couples the microprocessor 700 with each of the above mentioned components to enable the bidirectional exchange of data when properly addressed. Additionally, the address bus 702 and the data bus 704 couple the microprocessor 700 with two shift registers 718 and 719 which provides parallel to serial and serial to parallel conversion for data communicated to and from the TDM bus 300. The MPU 700 accepts a clock input from a clock source 720 which may be of any appropriate clock frequency that is acceptable within the MPU manufacturer's specifications. In the preferred embodiment, MPU 700 provides a clock output signal 722 which has a frequency of approximately the clock frequency of clock source 720 divided by ten. The clock signal 722 feeds the VIA 706 which is used to communicate status and control information to the TDM bus control and timing logic 724. The TDM bus control and timing logic block 724 send timing information to both the shift registers 718 and 719 and the audio convertors (AD-DA) 726. Audio from the dispatcher is A/D converted and placed on the TDM bus 300 and sent to an assigned T/R module To be forwarded (in analog form) to an assigned repeater. Also audio is received from the TDM bus (in digital form) and D/A converted to enable the dispatcher to monitor a call. The RAM module 708 provides temporary storage and workspace for the MPU 700 for any of its several operations. The EEPROM 710 provides more permanent storage of system parameters that are less susceptible to change but may, however, be periodically updated. The TOMI 306 communicates with the operator display panel via DUART port 716. The DUART port 716 may operate as any conventional serial link and may be, for example, an RS432 serial link. Status information is carried to the dispatcher and commands are taken from the dispatcher through the DUART port 716. In this way, the TOMI interfaces the dispatcher with the TDM bus giving the dispatcher access to the trunked system. As will be appreciated, the present invention is an intricate combination of electrical components. Accordingly, the present invention contemplates a diagnostic terminal which may run a diagnostic routine contained in the TOMI program space. Accordingly, provision is made through DUART port 714 to interface a diagnostic terminal through a serial link such as, for example, an RS232C link to accept instructions and print results of various diagnostic analysis. The EPROM 712 contains the operating program of the TOMI 306. The startup, operational and diagnostic routines all reside in a predetermined memory space within EPROM 712. Of course, EPROM 712 could be replaced with a read-only memory (ROM) if desired.

Referring now to FIGS. 8a–d there is shown flow diagrams illustrating the steps executed by the TOMI 306 during normal operation. Basically, the TOMI is either communicating, or waiting to communicate with a module on the TDM bus, or is sending status or receiving commands from the dispatcher. Decision 300 begins the routine by determining whether the dispatcher has depressed (keyed) his push-to-talk (PTT) switch. If decision 800 determines that the PTT switch has been keyed, item 802 generates a PTT request data packet, which is transmitted to the TIMI 308 on the TDM bus in item 804. The TOMI 306 then updates the channel status tables, which may typically be held in RAM 708 of FIG. 7. Following item 806, the routine returns to reference letter A to await the next communication. Decision 808, determines whether a PTT grant from the central has been received. Thus, if the PTT switch had been keyed and the appropriate steps followed, the TOMI would expect a PTT grant from the central, through the serial link 206, and sent from the TIMI 308 via the TDM bus 300 to the TOMI 306. If a PTT grant data packet has been received from the TDM bus, the routine proceeds to decision 810 to determine whether the trunking ID codes in the PTT grant match that of the dispatcher served by the TOMI. If the ID codes do not match, the routine returns to reference letter A to await the next communication. Assuming that the ID codes do match, the TOMI will instruct the dispatcher console to monitor the assigned channel in item 812. Item 814 updates the channel status tables and proceeds to decision 816 whih determines whether or not the PTT switch is still keyed. If for any reason the dispatcher has dekeyed the PTT switch, item 816 proceeds to item 817 which signals the dispatcher that a channel has been assigned. Decision 819 determines whether the dispatcher has re-keyed the PTT switch within a predetermined time interval. If so, the program proceeds to item 818, otherwise, program control returns to reference letter A. Normally, of course, the PTT switch will still be keyed and decision 816 proceeds to item 818 which formats a data packet and communicates it via the TDM bus 300 to an assigned T/R module, which will activate the local repeat disable function of the assigned trunked repeater 201 thereby enabling the dispatcher audio to be transmitted. The dispatcher may then begin transmitting the message to the subscriber unit or units. Once the channel has been activated, the routine returns to reference letter A to await the next communication. Decision 820 determines whether the dispatcher has released or dekeyed the PTT switch. When the dispatcher has ended his message, and releases the PTT switch, decision 820 leads to item 822 which generates the dekey data packet for transmission on the TDM bus. Item 824 transmits the dekey data packet via the TDM bus to the assigned T/R module which will deactivate the local repeat disable. The channel then becomes available to be reassigned by the central 202 after all subscriber transmission cease. Item 826 updates the channel status tables and proceeds to reference letter A to await the next communication. If, however, decision 820 determines that the PTT switch has not been dekeyed the routine proceeds to reference letter B of FIG. 8b.

Figure 8A:
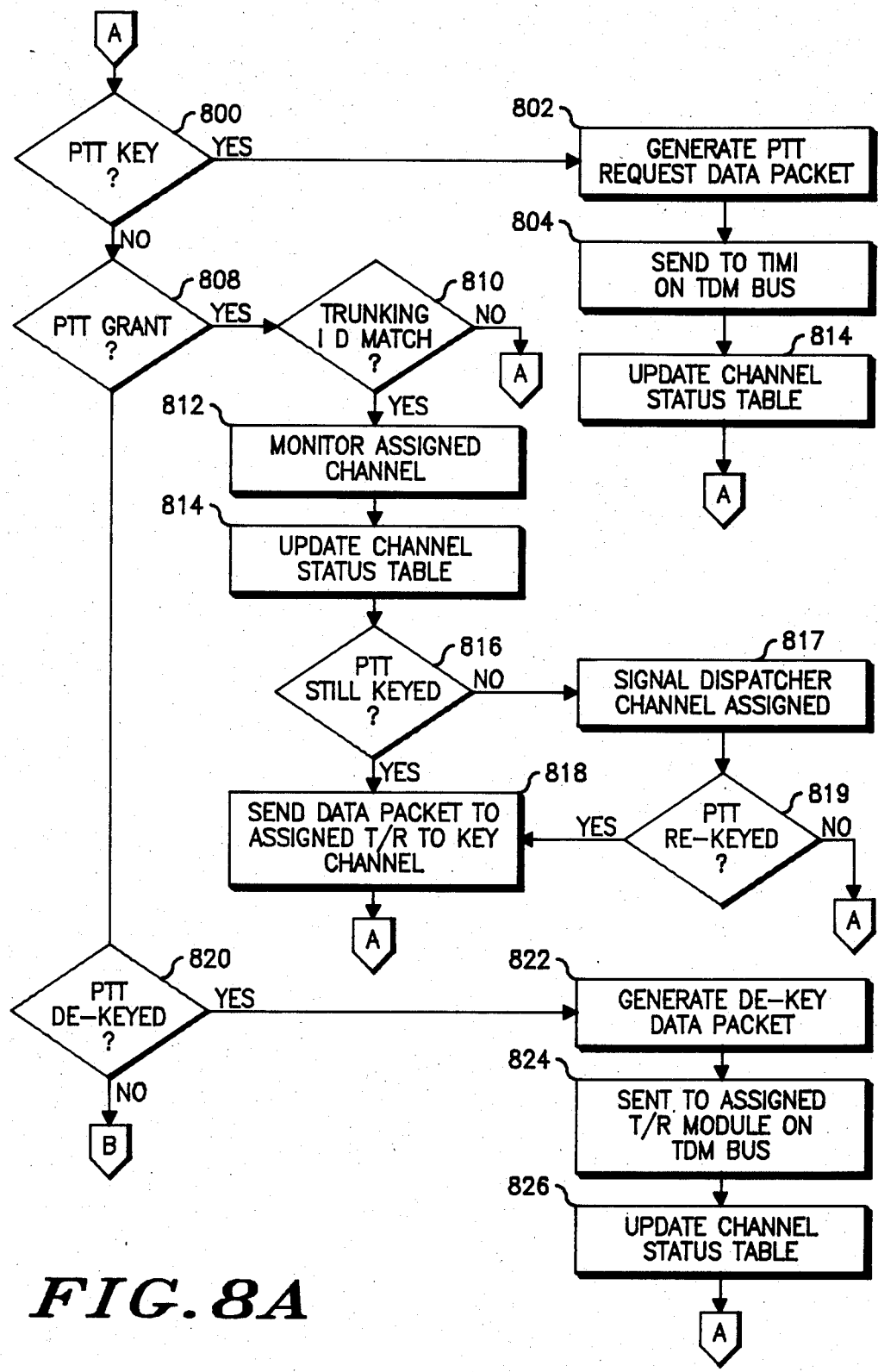
FIGS. 8a-c are flow diagrams of the steps executed by the TOMI of FIG. 7.
Figure 8B:
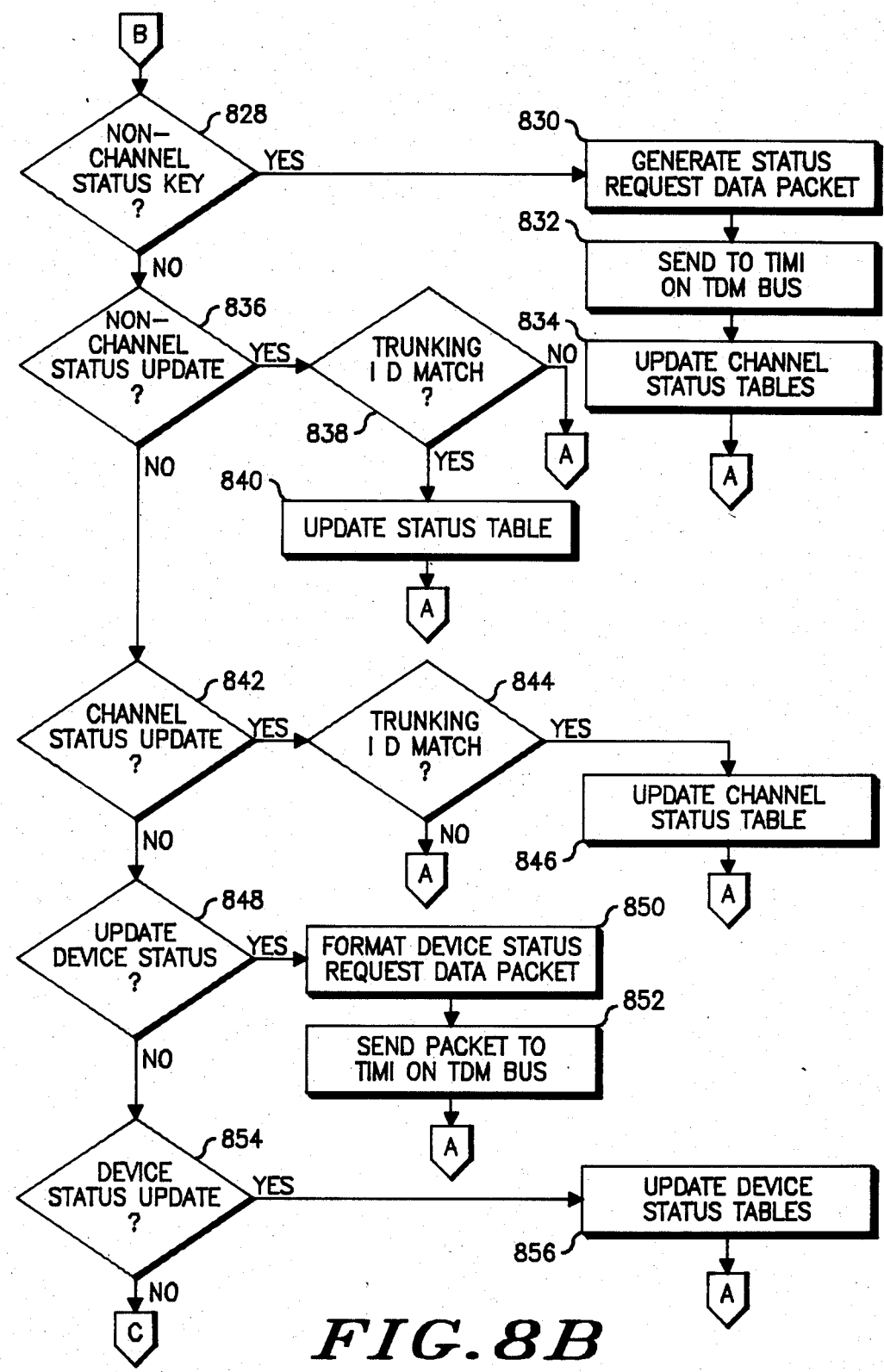

Referring now to FIG. 8b, the routine executed by the TOMI 306 continues in decision 828 to determine whether a non-channel status key has been depressed. The channel status activity is updated every time the dispatcher keys his PTT switch and on other status information updates supplied by the central. There also may be a plurality of non-channel status indications such as the current priority number in the central or other such supervisory and status functions as a particular system may need. Therefore, if decision 828 determines that a non-channel key has been depressed, item 830 generates a status request data packet for the appropriate information. The request is communicated to the TIMI 308 on the TDM bus in step 832. The TIMI 308 will then forward the request via the serial link 206 to the central controller 202. The routine next proceeds to item 834 where the channel status tables are updated whereafter the routine returns to reference letter A to its next communication. If decision 828 determine that a non-channel status key has not been depressed, the routine proceeds to decision 836 to see if a non-channel status update packet has been sent from the central. If a non-channel status update packet is recognized, decision 838 determines whether the trunking ID's of the TOMI and the data packet match. If they do not, the routine returns to reference letter A to await the next communication. Assuming that the ID codes match, the TOMI will update the appropriate status tables in item 840 and then return to reference letter A to await the next communication. Of course, if there can be non-channel status updates, there may be channel status updates. Accordingly, decision 842 determines whether the packet received is a channel status update. If so, decision 844 again determines whether the trunking ID codes match. If they do match, item 846 will update the channel status tables and then proceed to return to reference letter A to await the next communication. Of course, if decision 844 determines that the ID codes do not match the routine will also return to await the next communication. As previously mentioned, the TOMI 306 of the present invention has diagnostic routines resident in the EPROM 712. The diagnostic routines run as a "background task" and verify the integrity of the modules within the console network 204. The diagnostic routine may require information about the operational status of the RIB 312 and the TIB 318 of the central 202. Accordingly, the TOMI 306, from time to time, may request operational information from the central 202. Decision 848 determines whether the TOMI requires operational information. An affirmative decision routes program control to item 850, which formats a device status update request. Item 852 sends the packet to the TIMI 308 to be forwarded to the central 202. The central, of course may send a device status update block to the console network 204. Decision 854 determines whether such a packet was received and routes control to item 856 to update the device status tables resident in the TOMI. If no device status packets were received, the program proceeds to reference letter C of FIG. 8c.

Figure 8C:
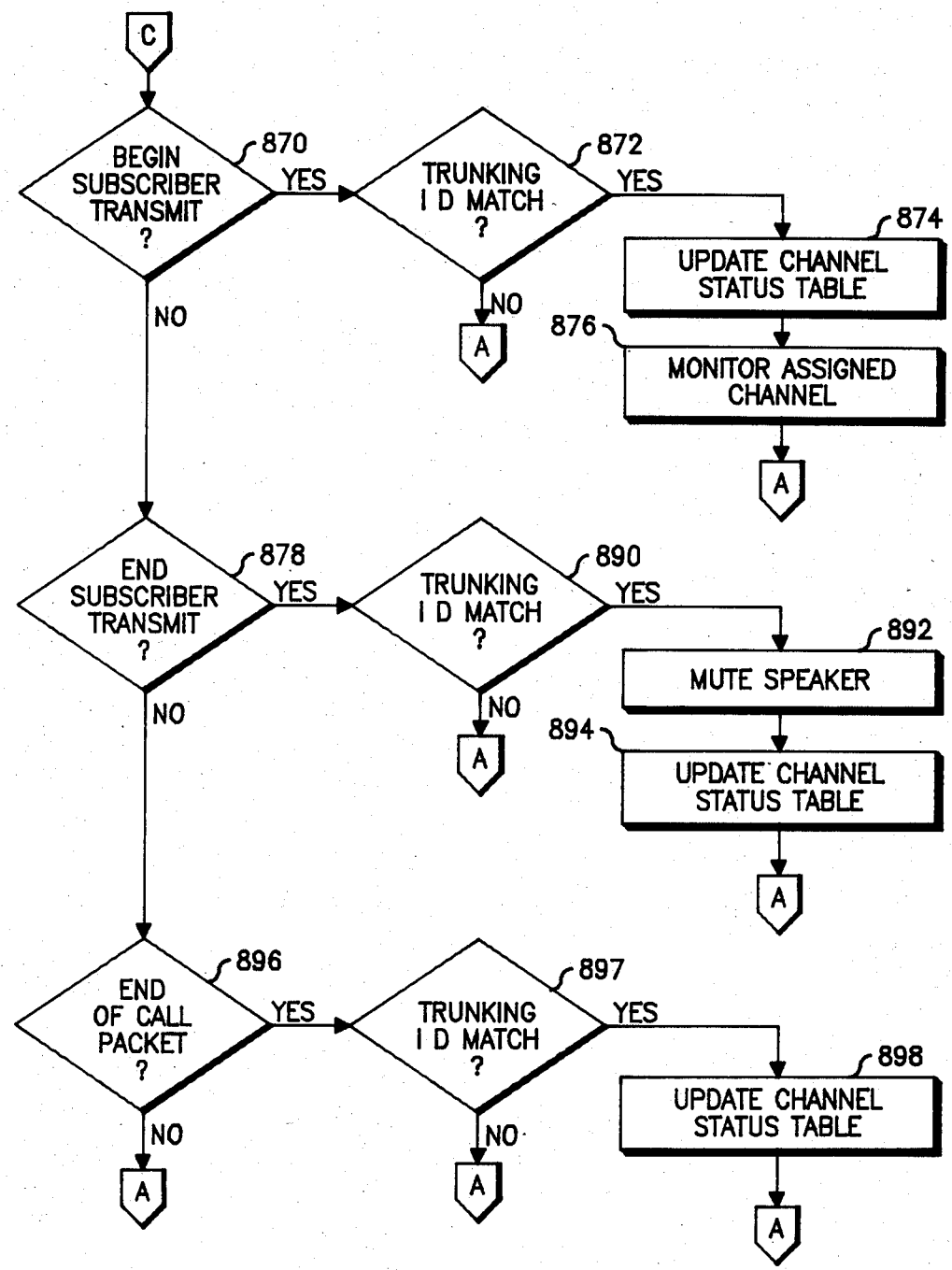

In FIG. 8c, the executive routine executed by the TOMI 306 continues in decision 870, which determines whether a subscriber unit has begun transmission. If a subscriber unit initiates a conversation the central 202 informs the TIMI 308 via the serial link 206. The TIMI, in turn, informs the TOMI 306 via the TDM bus 300 that the subscriber has a channel assigned and has begun transmission. Thus, if decision 870 determines that a subscriber has begun the transmission the routine proceeds to decision 872 to investigate the data packet sent from the TIMI 308 to determine if the trunking ID is one for the dispatcher to monitor. If not, the routine exits and returns to reference letter A to await the next communication. If the ID id valid, however, the routine proceeds to item 874 which updates the channel status table and, in item 876, begins to monitor the assigned channel (and thus the conversation). Once the monitoring begins (i.e., the speaker is unmuted) the routine returns to reference letter A to await the next communication. When the subscriber ends his transmission, the central 202 also communicates (via the serial link 206) the appropriate information to the TIMI 308, which forwards the information to the TOMI 306 via the TDM bus 300. Accordingly, decision 878 detects a data packet indicating an end-of-subscriber transmission. Decision 890 again investigates to determine whether the trunking ID codes match, if they do not the routine returns to reference letter A to await the next communication. If, however, the ID's match, the dispatcher speaker is muted, in item 892, and the routine proceeds to item 894, which updates the channel status tables and returns to reference letter A to await the next communication. After the call is completed, the central 202 will send the TIMI an end-of-call (EOC) block. The TIMI 308 then forwards the EOC information to the TOMI 306 via the TDM bus 300. Decision 896 determines whether an EOC packet was received. If an EOC packet was not received, the routine proceeds to reference letter A to await the next communication. If decision 896 determines an end of call packet was received, decision 897 investigates whether the trunking ID codes match. If the ID codes do not match, the routine returns to reference letter A to await the next communication. If the ID codes match, the routine proceeds to item 898 which updates the channel status tables and then returns to await the next communication. Thus, the TOMI 306 is continually looping through decision blocks to determine whether a data packet was received or the dispatcher has initiated a command.

Figure 9:
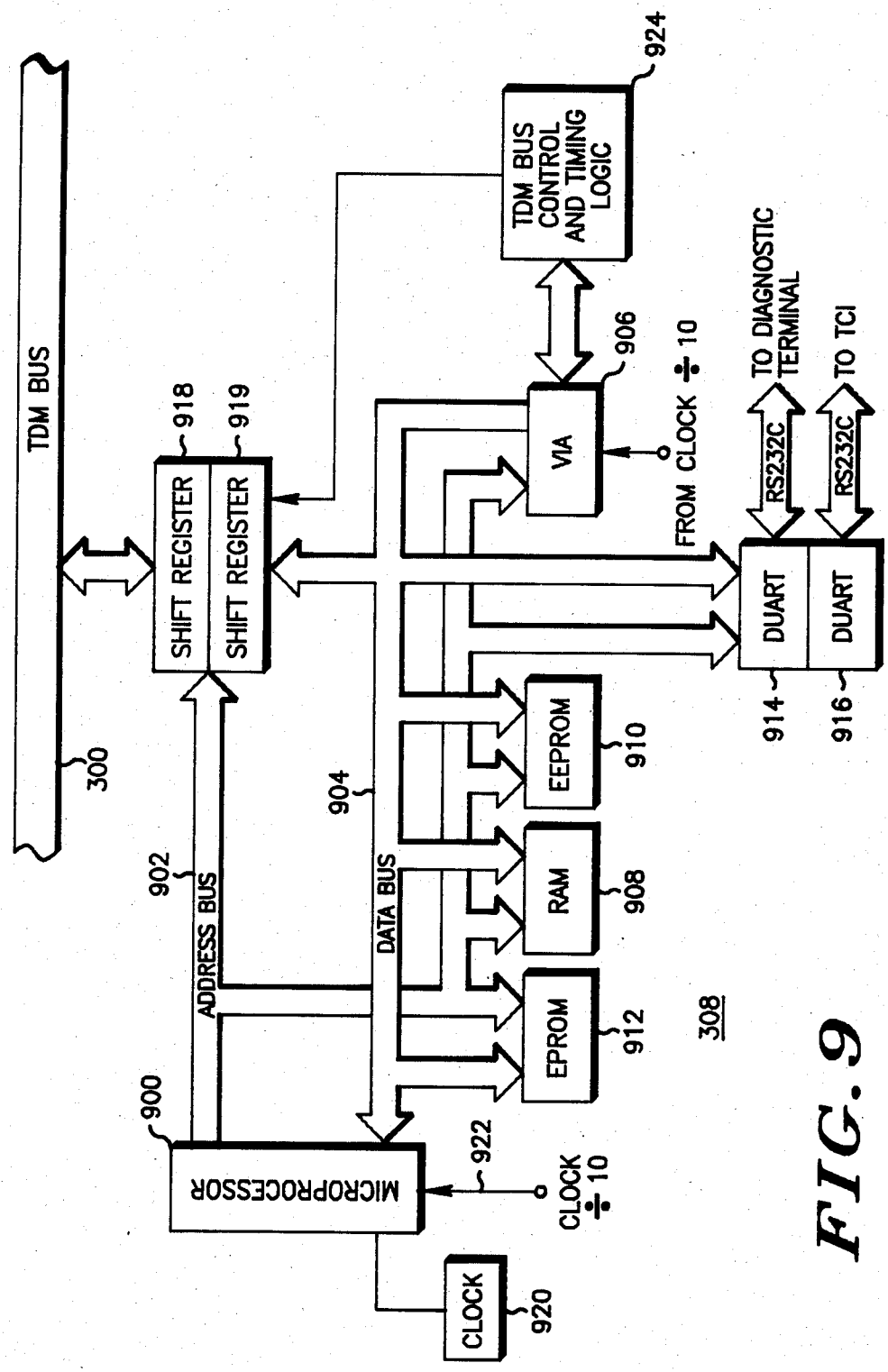
FIG. 9 is a block diagram of the TIMI of FIG. 3.

Referring now to FIG. 9, there is shown a block diagram of the TIMI 308 of FIG. 3. The TIMI module comprises a general purpose microprocessor which interfaces with a plurality of other components via an address bus 902 and a data bus 904. Microprocessor 900 may be any general purpose microprocessor such as a Motorola MC68000 available from Motorola, Inc. The address bus 902 couples the microprocessor 900 with a versatile interface adapter (VIA) 906, a random access memory (RAM) 908, an electronically erasable programmable read-only memory (EEPROM) 910, an erasable programmable read-only memory (EPROM) 912, and a dual universal asynchronous receiver/transmitter (DUART) having ports 914 and 916. The data bus 904 also couples the microprocessor 900 with each of the above mentioned components to enable the bi-directional exchange of data when properly addressed. Additionally, the address bus 902 and the data bus 904 couple the microprocessor 900 with two shift registers 918 and 919 which provide parallel to serial and serial to parallel conversion for data communicated to and from the TDM bus 300. The MPU 900 accepts a clock input from a clock source 920 which may be of any appropriate clock frequency that is acceptable within the MPU manufacturer's specifications. In the preferred embodiment, MPU 900 provides a clock output signal 922 which has a frequency of approximately the clock frequency of clock source 920 divided by ten. The clock signal 922 feeds the VIA 906 which is used to communicate status and control information to the audio and TDM bus control and timing logic 924. The TDM bus control and timing logic block controls the shift registers 918 and 919 with appropriate timing signals to enable data exchange with the TDM bus 300. The RAM module 908 provides temporary storage and workspace for the MPU 900 for any of its several operations. The EEPROM 910 provides more permanent storage of system parameters that are less susceptible to change but may, however, be periodically updated. The TIMI 308 communicates with TCI 322 via DUART port 916. The DUART port 916 may operate as any conventional serial link and may be, for example, an RS232C serial link. As will be appreciated, the present invention is an intricate combination of electrical components. Accordingly, the present invention contemplates a diagnostic terminal which may run a diagnostic routine contained in the TIMI program space. Accordingly, provision is made through DUART port 914 to interface a diagnostic terminal through a serial link such as, for example, an RS232C link to accept instructions and print results of various diagnostic analysis. The EPROM 912 contains the operating program of the TIMI 308. The startup, operational and diagnostic routines all reside in a predetermined memory space within EPROM 912. Of course, EPROM 912 could be replaced with a read-only memory (ROM) if desired.

Figure 10A:
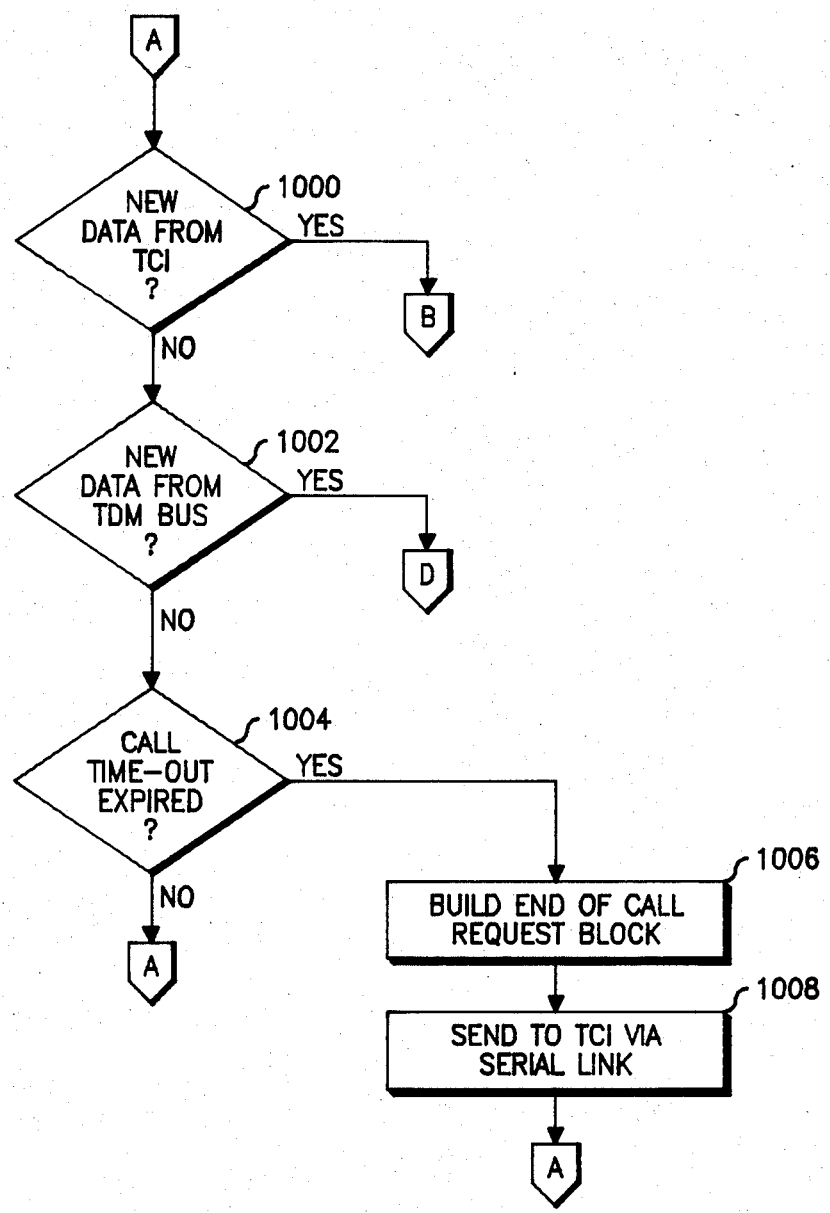
FIG. 10a-d are flow diagrams illustrating the steps executed by the TIMI of FIG. 9.

Referring now to FIGS. 10a-d, there is shown a flow diagram illustrating the steps executed by the TIMI 308 during normal operation. In FIG. 10a, the "executive" routine is illustrated, which begins with decision 1000 to determine whether new data has been received from the TCI 322 via the serial link 206. If there has been a block communication from the TCI, the routine exists to reference letter B of FIG. 10b. If the determination of decision 1000 is that no new data has been received from the TCI, the routine proceeds to decision 1002 which determines whether new data has been received from the TDM bus 300. If there has been new data received, the routine proceeds to reference letter C of FIG. 10c. Otherwise, the routine proceeds to decision 1004 to determine whether there has been a call time-out expiration of any call currently in progress. Ultimately, each communication on the trunked system must end with an end-of-call (EOC) indication. The TIMI 308 monitors the TDM bus 300 looking for data packets indicating that assigned repeaters are still keyed, which indicates a call is still in progress. A timer routine is executed in the TIMI 308 which determines whether the TIMI has failed to receive a repeater key data packet from the TDM bus 300 within the predetermined timer period. If no indication is received, indicating that communication has ceased, the TIMI will build an end-of-call request block in item 1006, and send it to the TCI 322 in item 1008 via the serial link 206. In addition, the TIMI creates an end-of-call timer for all subscriber calls. If a timer should time-out, the TIMI will build an EOC block and send it to the TCI. The TCI will process the request and forward to the CSC 320 if all subscriber activity has also ended. The CSC 320 will then terminate the call and so inform the TCI. The TCI then informs the TIMI which, in turn, informs the TOMI.

Figure 10B:
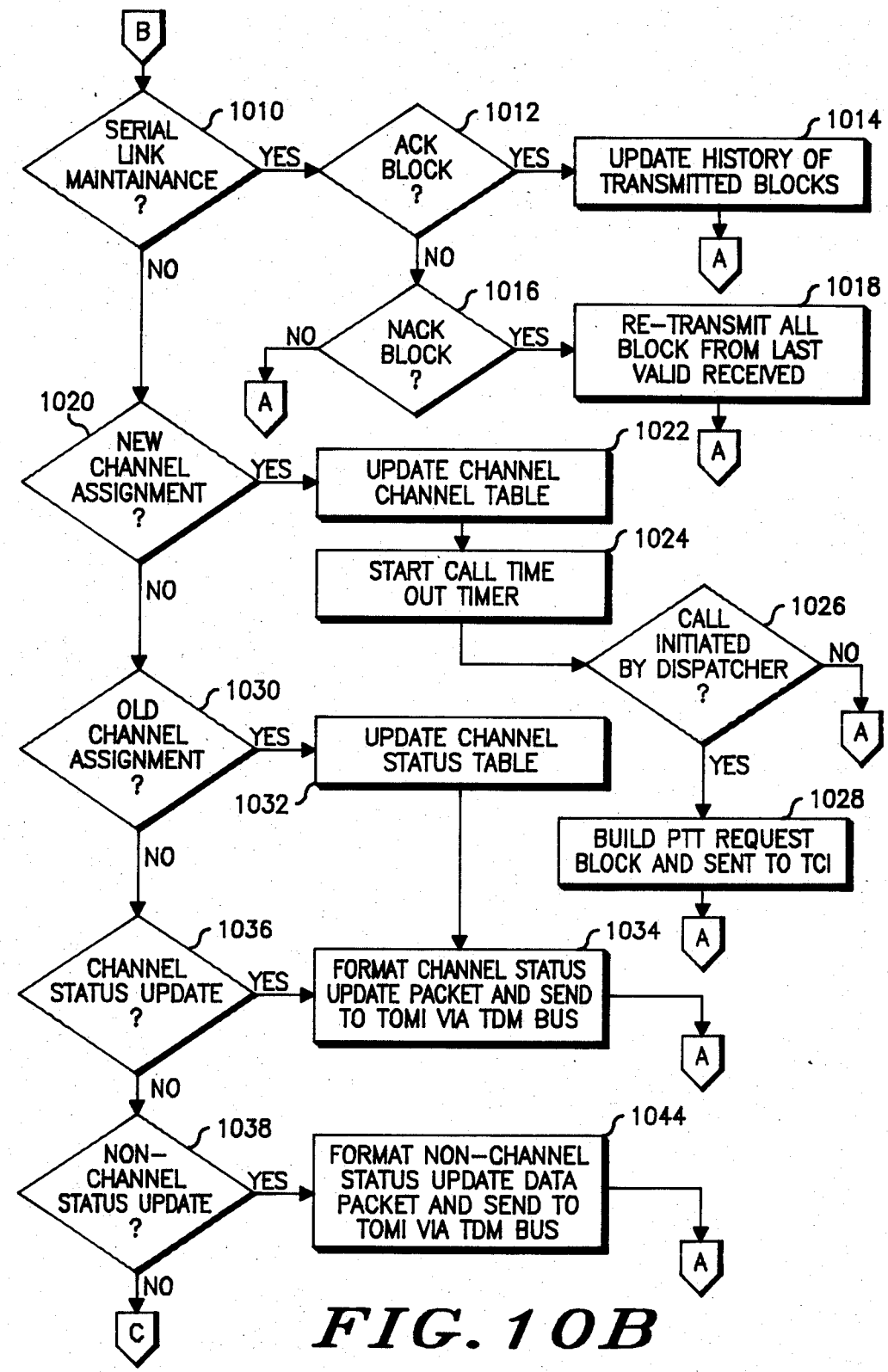

Referring now to FIG. 10b, there is illustrated the flow diagrams executed by the TIMI in response to new data received from the TCI 322. The routine begins in decision 1010 which determines if the block received from the TCI concerns serial link maintenance. If it does, the decision 1012 determines whether or not an ACK block was sent from the TCI. If the determination of decision 1012 is that an ACK block has been received, item 1014 updates the history of the transmitted blocks in the memory field of the TIMI 308. The update is accomplished by discarding all blocks transmitted up to the last validity received block, which is extracted from the error byte of the acknowledge block. After updating the history, the routine returns to the executive program of FIG. 10a. If the determination of decision 1012 is that the acknowledge block was not received, decision 1016 decides whether or not a NACK block has been received. If the block was not a NACK block the routine exits and returns to the executive program of FIG. 10a. However, if the determination of decision 1016 is that a NACK block was received, the TIMI knows that one or more blocks was not received by the TCI. Accordingly, item 1018 retransmits all the blocks from the last validity receive block extracted from the error byte of the received NACK block. In this way, a redundancy mechanism is incorporated into the present invention to ensure complete data transfer. After retransmission, the routine returns to the executive program of FIG. 10a. If the new data from the TCI was not a data block concerning a serial link maintenance, decision 1010 proceeds to decision 1020 which determines whether the data block is a new channel assignment. If decision 1020 determines that a new channel assignment has been received, the routine proceeds to item 1022 where the channel status tables are updated. Item 1024 starts the call time-out-timers which will then determine the period of time that the TIMI must wait before building an EOC block for a subscriber initiated call, or that the TIMI must "see" (receive) a repeater key data packet on the TDM bus 300 for a dispatcher initiated call. After the timer is initialized, the routine proceeds to decision 1026 which determines whether the call was initiated by a dispatcher or subscriber. if decision 1026 determines that the call was not initiated by this dispatcher (i.e., the call was initiated by the subscriber) the routine returns to the executive routine of FIG. 10a. If, however, the call was initiated by the dispatcher, decision 1026 proceeds to item 1028 where the TIMI builds a PTT request communication block and sends it to the TCI. This second PTT request block will enable the central to respond with a PTT grant which the TIMI can then forward to the TOMI. Thus, when the dispatcher presses his PTT switch the first PTT request to the central will be responded with a channel assignment. When the TIMI receives the channel assignment it automatically sends the second PTT request to the central which enables the central to respond with a PTT grant which is then forwarded to the TOMI and indicates that the dispatcher may begin his communication. If decision 1020 determines that the data block is not a new channel assignment the routine of FIG. 10b proceeds to decision 1030 which determines whether the data block is an old channel assignment. If the block is an old channel assignment, the routine proceeds to item 1032 which updates the channel status tables. Next, the TIMI formats a channel status update data packet in item 1034 which is forwarded to the TOMI via the TDM bus. If the determination of decision 1030 is that the data packet is not an old channel assignment, the routine proceeds to decision 1036 which determines whether or not the communication block is a channel status update block. If the determination of decision 1036 is that the received block is a channel status update block, the routine formats the channel status update packet and sends it to the TOMI via the TDM bus in step 1034 prior to returning to the executive routine of FIG. 10a. Decision 1038 determines whether a non-channel status update has been received. Upon receiving a non-channel status update block, the routine proceeds to item 1040, which formats a non-channel status update packet and sends it to the TOMI via the TDM bus 300. Decision 1042 determines whether the communication block received was a device status update block. Upon receiving a device status update block, the routine proceeds to item 1044 which formats a device status update data packet and sends it to the TOMI via the TDM bus. The routine then returns to the executive routine of FIG. 10a. If decision 1042 determines that the block was not a device status update, the routine proceeds to reference letter C of FIG. 10c.

Figure 10C:
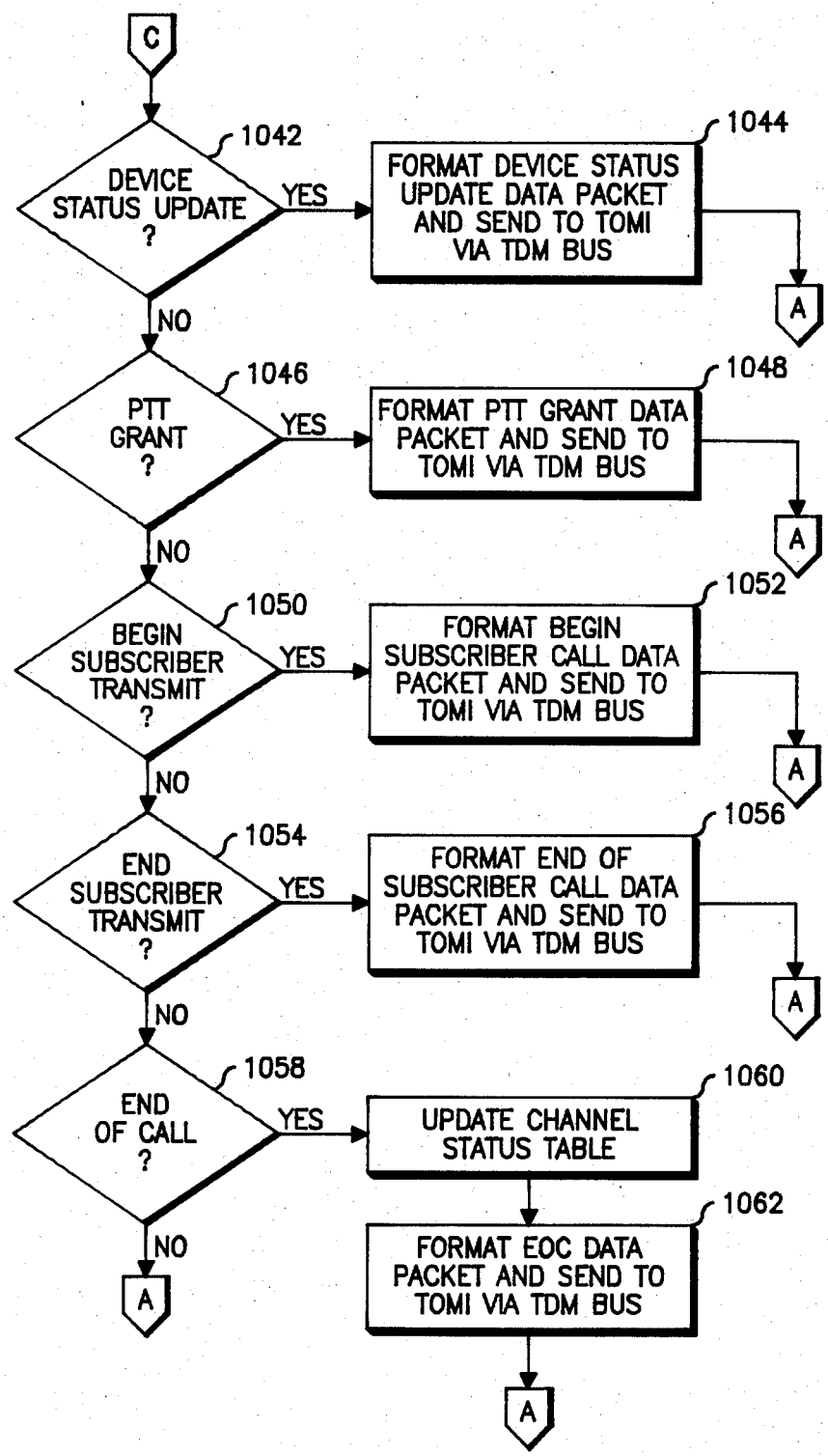

In FIG. 10c, the routine handling communication blocks from the TCI to the TIMI continues with decision 1046 which determines whether the communication block received was a PTT grant. Item 1048 formats a PTT grant data packet and communicates it to the TOMI via the TDM bus in response to an affirmative decision of decision block 1046. Decision 1050, determines whether the communication block indicated the beginning of a subscriber transmission. Item 1052 formats the data packet for a begin subscriber call and sends it to the TOMI via the TDM bus. The routine then returns to the executive routine of FIG. 10a. An affirmative decision from decision 1054 indicates that an end subscriber transmission communication block was received. Accordingly, item 1056 forms an end-of-subscriber call data packet and sends it to the TOMI via the TDM bus. If a call has just completed, decision 1058 will recognize an end-of-call data block and the routine will proceed to item 1060 which updates the channel status tables and proceeds to item 1062 which formats the end of call data packet and sends it to the TOMI via the TDM bus. The routine then returns to the executive routine of FIG. 10a.

Figure 10D:
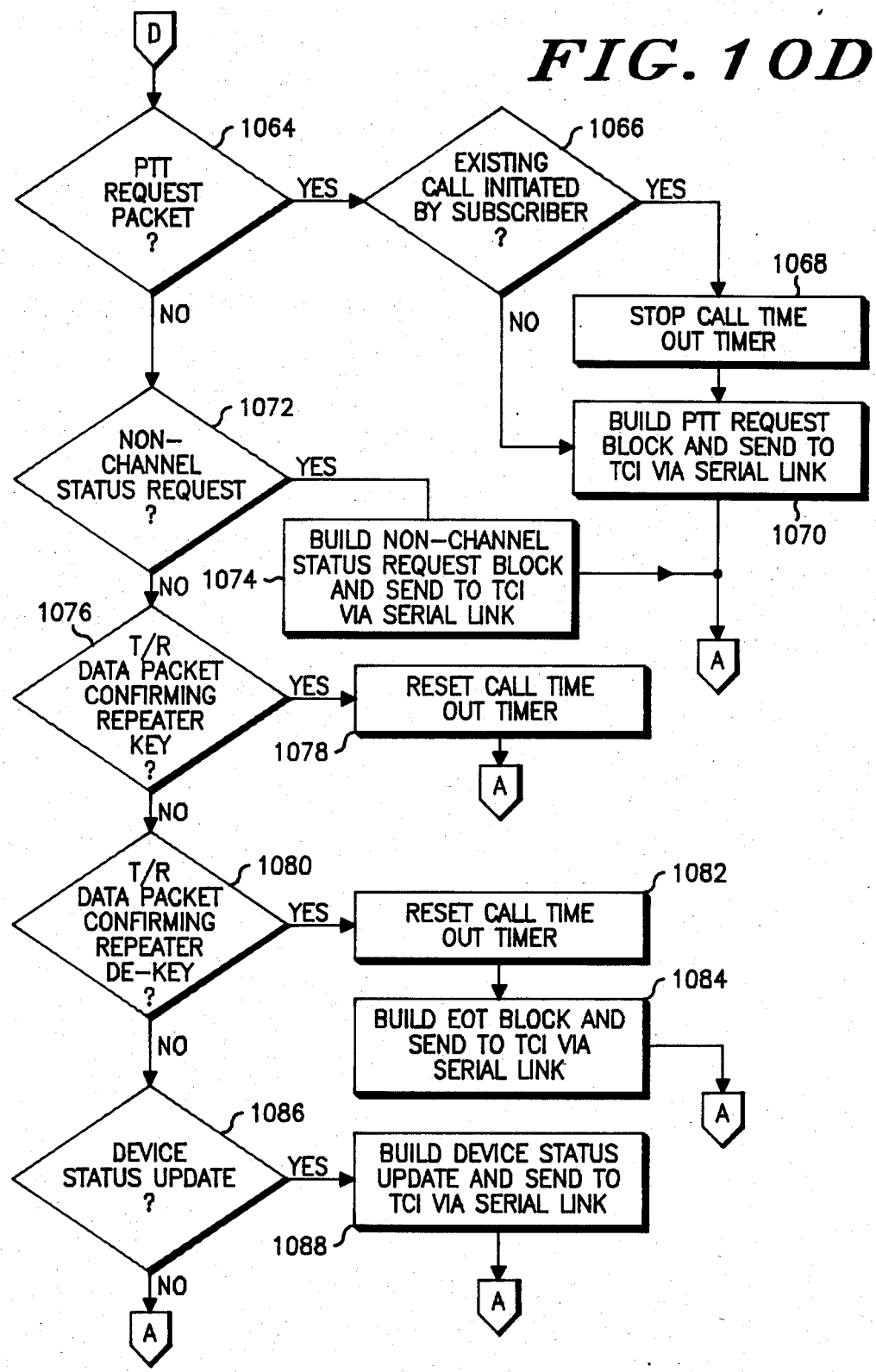

Referring now to FIG. 10d, there is shown the list of steps executed by the TIMI when receiving data packets from a TOMI 306. The routine begins in decision 1064 which determines whether the receive data packet is a PTT request packet. An affirmative determination by decision 1064 leads to decision block 1066 which determines whether there is an existing group or sub-group call that was initiated by a subscriber. If not, meaning that there is no group or sub-group call, the routine proceeds to item 1070 which builds a PTT request block and sends it to the TCI via serial link 206. If decision 1056 determines that a subscriber initiated call exists, item 1068 stops the time out timer and proceeds to item 1070 where again, the PTT request block is built and sent to the TCI via the serial link. Decision 1072 determines whether the received data packet is a non-channel status request packet. Thus, if the TOMI has sent a non-channel status request via the TDM bus item 1074 is executed which builds a non-channel status request block and sends it to the TCI via the serial link. If the data packet sent by the TOMI is a T/R data packet confirming the repeater key, decision 1076 routes program control to item 1078 which resets the time-out-timer. Thus, whenever the TIMI receives a data packet confirming that the repeater is still keyed (meaning that a dispatcher call is still in progress) the call time-out-timer is reset which prohibits an end-of-call request block from being transmitted to the central 202. If however, the data packet received by the TIMI is a T/R data packet confirming the repeater dekey, decision 1080 routes program control to item 1082 which resets the call time-out-timer module and proceeds to item 1084 which builds the end of transmit block and sends it to the TCI via the serial link. Decision 1086 determines whether the data packet received was a device status update. Thus, if decision 1086 determines that a device status update packet was received, program control is routed to item 1088 which builds the device status update block and sends it to the TCI via the serial link. If the result of decision 1086 is that a device status update block was not received the programmer control is returned to the executive routine of FIG. 10a.

Referring now to FIG. 11, there is shown a block diagram of the TCI 322 of FIG. 3. The TCI module comprises a general purpose microprocessor 1100 which interfaces with a plurality of other components via an address bus 1102 and a data bus 1104. Microprocessor 1100 may be any general purpose microporcessor such as a Motorola MC6809 available from Motorola, Inc. The address bus 1102 couples the microprocessor 1100 with a periferal interface adapter (PIA) 1106, a random access memory (RAM) 1108, an erasable programmable read-only memory (EPROM) 1112, and five asynchronous communication interface adaptors (ACIA's) 1114 through 1117. The data bus 1104 also couples the microprocessor 1100 with each of the above mentioned components to enable the bi-directional exchange of data when properly addressed. The MPU 1100 accepts a clock input from a clock source 1120 which may be of any appropriate clock frequency that is acceptable within the MPU manufacturer's specifications. The PIA 1106 communicates status information to the status display 1124. The RAM module 1108 provides temporary storage and workspace for the MPU 1100 for any of its several operations. The TCI 322 communicates with the operational TIMI 308 via ACIA 1117, and the standby TIMI 308' via ACIA 1118. The TCI 322 communicates internally (to the central 202) with the CSC 320 via ACIA 1114, the RSC 314 via ACIA 1115, and monitors the CSC-TSC link 330 via ACIA 1116. Each of the ACIA's 1114–1117 may operate as any conventional serial link and may be, for example, an RS232C serial links. The TCI 322 may communicate with other console networks via additional pairs of ACIA's 1117 and 1118. In this way several dispatchers from several locations may use the same central controller, and thus, the same trunked system. The EPROM 1112 contains the operating program of the TCI 322. The startup, operational and any diagnostic routines all reside in a predetermined memory space within EPROM 1112. Of course, EPROM 1112 could be replaced with a read-only memory (ROM) if desired.

Figure 12A:
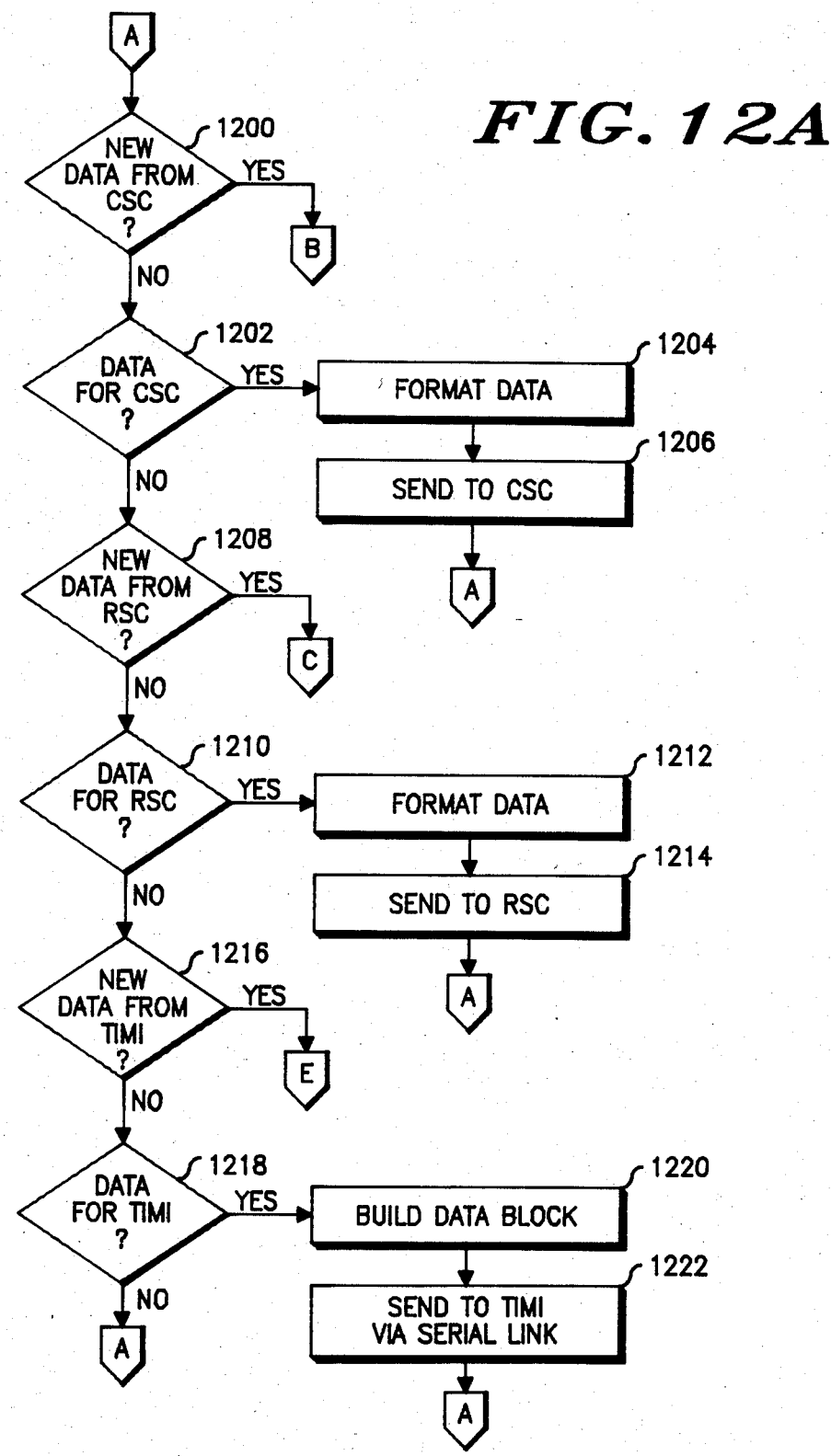
FIG. 12a-f are flow diagrams illustrating the steps executed by the TCI of FIG. 11.

Referring now to FIGS. 12a-f, there is shown the steps executed by the TCI 322 during its normal operation. In FIG. 12a, the steps of the "executive" routine are illustrated. The executive begins with decision 1200 which determines whether new data has become available from the CSC 320. If new data has come in, the routine exits to referenece letter B to process the data. If no data is available from the CSC, the routine proceeds to decision 1202 which checks to see if there is any data to be sent to the CSC. An affirmative decision from decision 1202 transfers control to item 1204, which formats the data. The data is sent to the CSC 320, in item 1206, via serial link 328. If there is no data to transmit to the CSC, the routine proceeds to decision 1208 to determine whether new data is available from the RSC 314. If the RSC has presented new data to the TCI 322, the routine exits to reference letter C to process the data. Otherwise the routine proceeds to decision 1210 to determine if there is any data to be sent to the RSC. If decision 1219 determines that there is data available to be transmitted to the RSC 314, the routine proceeds to item 1212 which formats the data in a suitable form to be transmitted to the RSC in item 1214. If the TCI has no data to transmit to the RSC, the routine proceeds to item 1216 which determines whether new data has become available from the TIMI 308. If the TIMI has transmitted some data over the serial link 206, the routine exits to reference letter E to process the data. Otherwise, the routine proceeds to item 1218 to see if there is any data to be transmitted to the TIMI. An affirmative decision from decision block 1218 will transfer over to the routine control to item 1220 to build the appropriate data block, which is transmitted to the TIMI via serial link 206 in item 1222. Following this the routine exits to reference letter A to repeat the executive until data is available for reception or transmission.

Figure 12B:
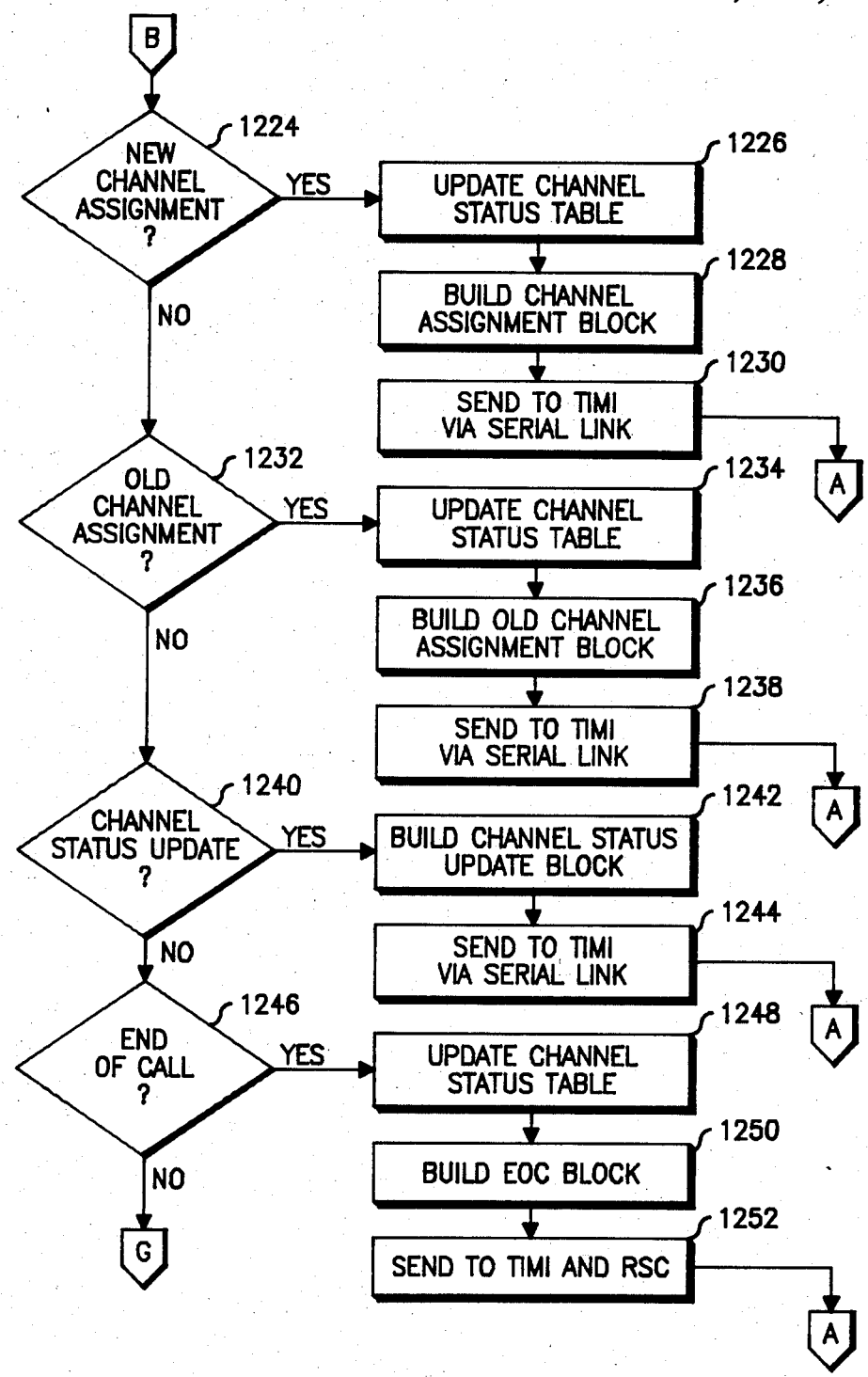

Referring now to FIG. 12b, there is shown steps executed by the TCI to process data received from CSC. Beginning with decision 1224, which determines whether a new channel assignment has been received, TCI first updates the channel status table in item 1226. Following this step, the channel assignment block is built in item 1228, which is transmitted to the TIMI via serial link 206 in item 1230. Following this, program control returns to the executive routine of FIG. 12a. If a new channel assignment has not been sent the routine proceeds to decision 1232 to determine if an old channel assignment package has been sent. If the decision of 1232 determines that an old channel assignment packet has been received, program control is routed to item 1234 which updates the channel status table and proceeds to item 1236, which builds the old channel assignment block. Item 1238 transmits the channel assignment block to the TIMI via serial link 206. Decision 1240 determines whether a channel status update package has been received from the CSC. If an update was received, item 1242 builds the channel status update block, which is sent to the TIMI via the serial link 206 in item 1244. In the absence of a channel status update packet, the routine proceeds to decision 1246 which determines whether an end-of-call (EOC) packet has been received. If an affirmative decision is reached in decision 1246, the routine control is transferred to items 1248 which first updates the channel status table, after which control goes to item 1250 to build the EOC block. In item 1252 the EOC block is sent to the TIMI via the serial link 206 and to the RSC via serial link 326. Assuming now that an EOC packet was not sent, the routine proceeds to item 1254 to determine if a device status update was received. As previously mentioned, the device status table contains the operational status of several operational blocks in both the central and console network. If a module fails or malfunctions, the status is changed in the status table to indicate which modules are active and which are faulty. If decision 1254 determines that a device status update packet has been received, item 1256 is executed which updates the device status tables. The routine proceeds next to item 1258 which builds a device status block, which is transmitted to the TIMI and the RSC in item 1260. Decision 1262 determines whether a non-channel status update has been received. As previously mentioned, a non-channel status can be a priority number or other such system parameter as may be required or desired in any particular implementation. If decision 1262 determines that a non-channel update has been received, program control is routed to item 1264 which builds a non-channel status block. The non-channel status block is communicated to the TIMI via the serial link 206 in item 1268. Following this program control is returned to the executive routine of FIG. 12a.

Figure 12C:
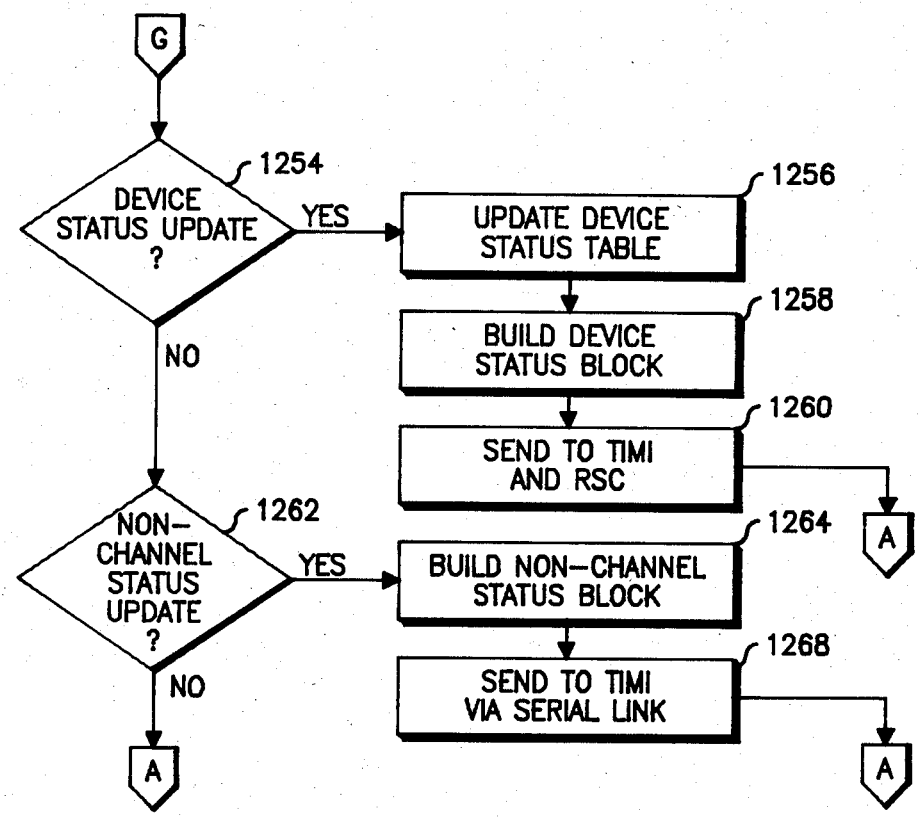
Figure 12D:
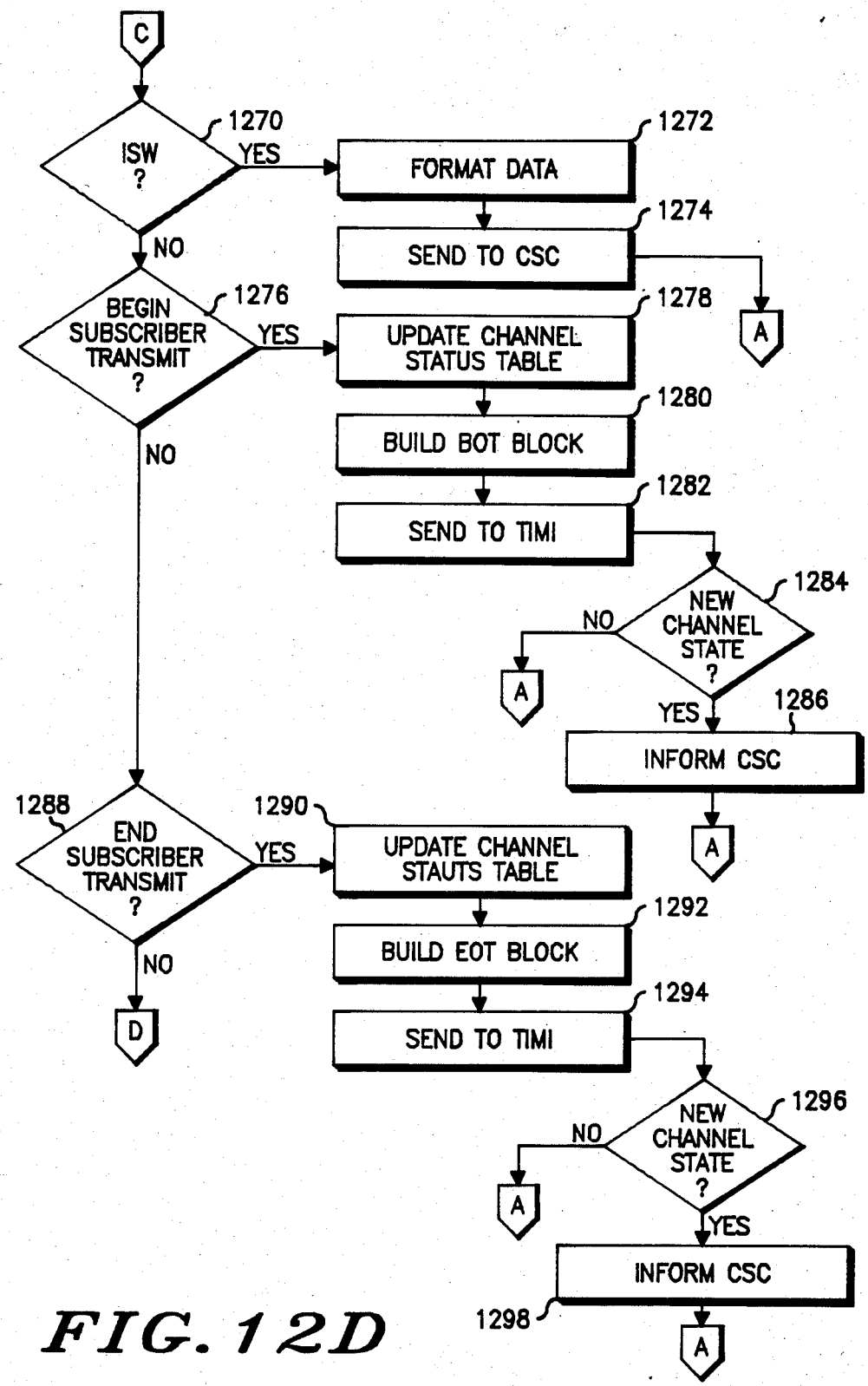

Referring now to FIGS. 12c-d, there is shown the steps executed by the TCI when processing data from the RSC. FIG. 12c begins with decision 1270 which determines whether an ISW has been detected. If decision 1270 determines that an ISW has been received, program control is routed to item 1272 which formats the data. The formatted ISW is sent to the CSC in item 1274 so that a channel may be assigned. If however, decision 1270 determines that an ISW is not received the routine proceeds to decision 1276 which determines whether the subscriber has begun to transmit. Assuming that a subscriber has been assigned a channel and now begins to transmit, item 1278 updates the channel status tables and proceeds to item 1280 where the begin-of-transmit (BOT) block is built. The BOT block is sent to the TIMI via the serial link 206 in item 1282, after which control is routed to decision 1284 to determine whether there is a new channel state. If there is a new channel state, the routine proceeds to item 1286 to inform the CSC of the new channel state. Following this, or in the absence of a new channel state, program control is returned to the executive of FIG. 12a. If the subscriber has been transmitting, but ceases to transmit, decision 1288 will detect the end-of-subscriber transmission and route program control to item 1290 which will update the channel status tables and proceed to item 1292 to build an end-of-transmission (EOT) block. The EOT block is transmitted to the TIMI via the serial link 206 in item 1294, after which program control is routed to decision 1296 to determine whether there is a new channel state. Assuming that there is a new channel state, program control proceeds to item 1298 where the CSC is informed of the new channel state. Following this, or in the absence of a new channel state, control is returned to the executive routine of FIG. 12a. If decision 1288 determines that there has been no EOT packet received, program control is routed to reference letter D of FIG. 12d. In FIG. 12d, the routine executed by the TCI to process data from the RSC continues in decision 1300 to determine whether an end-of-call (EOC) request has been received. An affirmative decision from decision block 1300 routes program control to item 1302 which updates the channel status tables and proceeds to decision 1304 to determine whether there is a new channel state. If there is a new channel state, the routine proceeds to item 1306 where the CSC is informed via the serial link 328. Following item 1306, or in the absence of a new channel state from decision 1304, program control is returned to the executive routine of FIG. 12a. If an EOC request has not been received, the routine proceeds to decision 1308 to determine whether a device status update has been received. Assuming that a device status update was received, the program would continue to item 1310 to update the device status tables and proceed to decision block 1312 to determine whether there is a new device state. An affirmative determination from decision block 1312 will route program control to item 1314 where the CSC is informed of the new device state. A negative response from decision block 1312 will route program control to item 1316 to send a grant packet to the RSC. Following this, program control is returned to the executive of FIG. 12a.

Figure 12E:
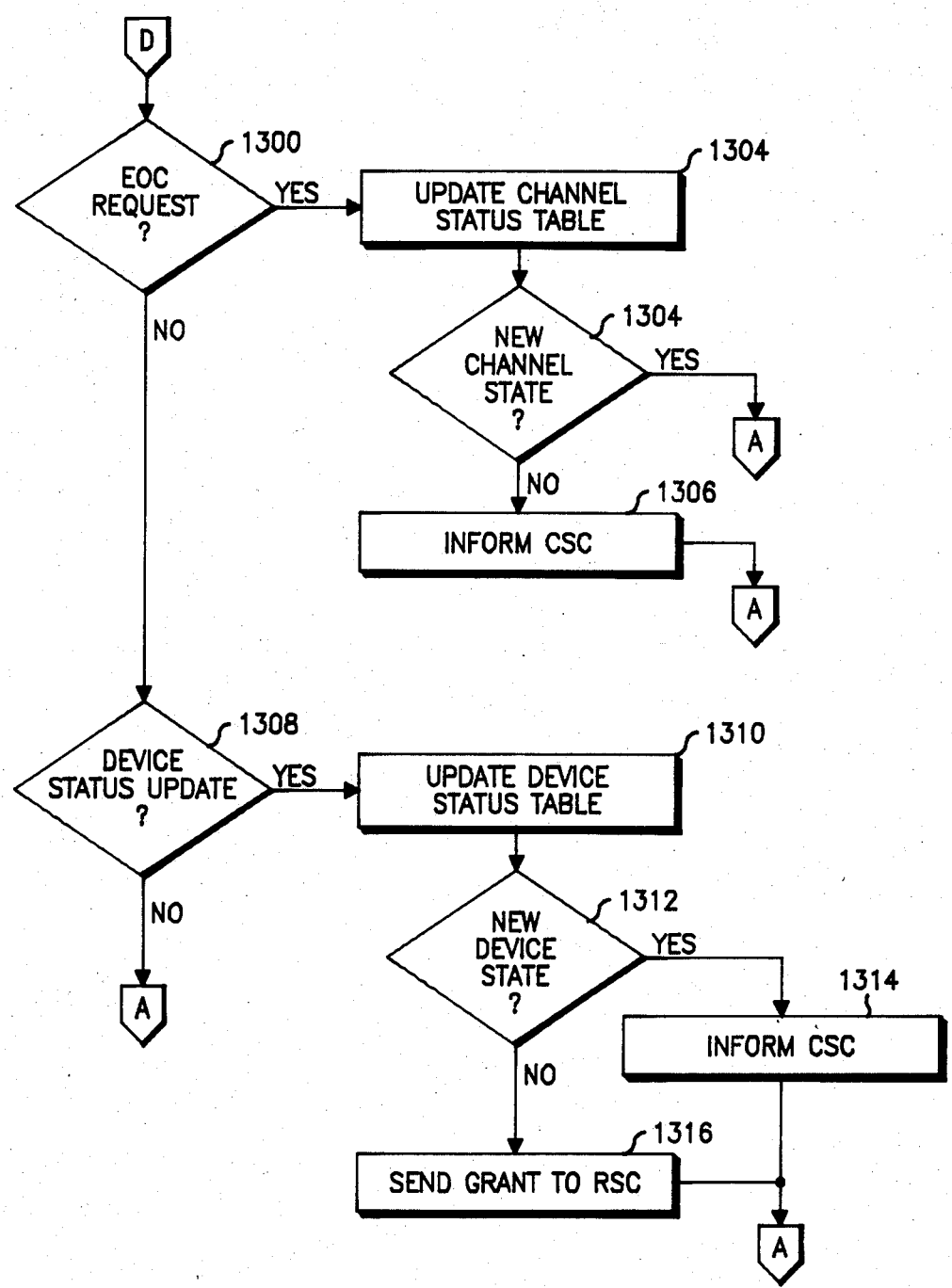
Figure 12F:
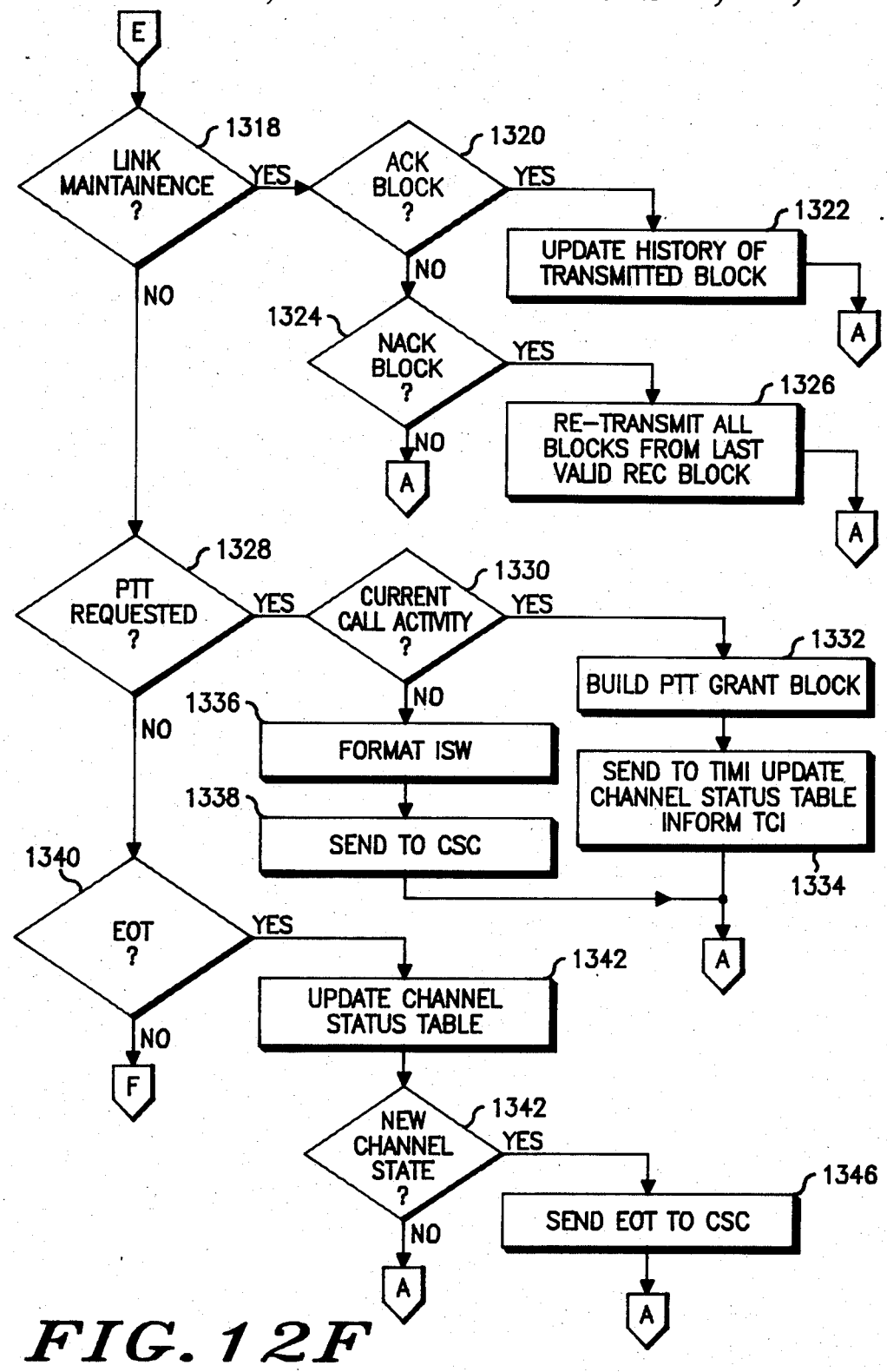
Figure 12G:
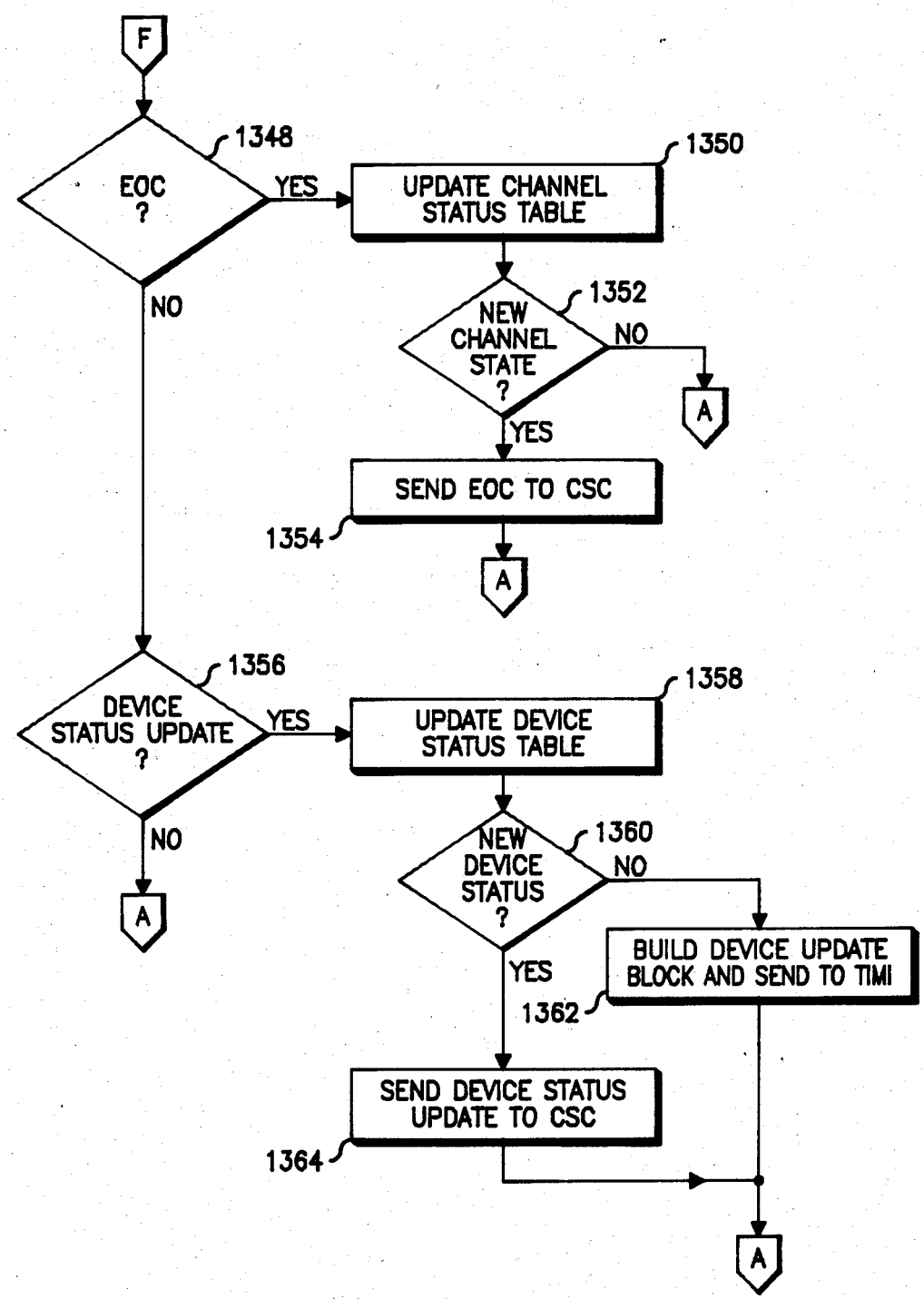

Referring now to FIGS. 12e-f, the steps executed by the TCI to process data from the TIMI is shown. FIG. 12e begins with decision 1318 which determines whether a data block has been received which deals with link maintenance. An affirmative decision from decision block 1318 transfers program control to decision 1320 to determine whether an ACK block was received. If an ACK block was received, program control is transferred to item 1322 which updates the history of the transmitted blocks by disposing of all blocks prior to the last validity receive block, which is taken from the error byte of the acknowledge block. A negative response from decision 1320 proceeds to decision 1324 to determine if a NACK block was received. A determination that an NACK block was received, routes program control to item 1326, which will retransmit all the blocks from the last validity receive block which is indicated from the error byte of the NACK block. In this way, a redundancy mechanism is incorporated into the present invention to ensure the proper reception of data. Following this, or the negative determination of decision block 1324, program control returns to the executive routine of FIG. 12a. If the received block does not deal with link maintenance, the routine proceeds to decision 1328 to determine whether a PTT request was received. An affirmative response from decision 1328 leads to decision 1330 to determine whither there is a current call activity present. If a call is currently in progress, the routine proceeds to item 1332 which builds a PTT grant block. Item 1334 sends the PTT grant block to the TIMI via the serial link 206. Additionally, the channel status table is updated and the TCI is informed if a new channel state has occurred. The TCI informs the CSC that the dispatcher call activity is still in progress thereby preventing the CSC from reassigning the channel. Of course, ultimately the PTT grant is sent to the dispatcher so that he may participate in the previously established call. A negative response from decision 1330 transfers program control to item 1336 which formats an ISW. The ISW is sent to the CSC in decision 1338 to request a channel for the dispatcher. A negative response from decision 1328 leads to decision 1340 to determine whether an end-of-transmit (EOT) packet was received. Assuming that an EOT packet was received, the routine proceeds to item 1342 which updates the channel status tables and transfers control to decision 1344 which determines whether there is a new channel state. If there is a new channel state, the program proceeds to item 1346 which sends the EOT packet to the CSC. Following this, or a negative determination by decision 1344, program control returns the executive routine of FIG. 12a. If an EOT packet was not received, the program proceeds to reference letter F of FIG. 12f. In FIG. 12f, the TCI routine that processes TIMI data proceeds in decision 1348 which determines whether an end-of-call (EOC) packet was received. An affirmative decision from decision block 1348 routes program control to item 1350 which updates the channel status table. Next, the routine proceeds to decision 1352 to determine whether a new channel state exists. Assuming that a new channel state does exist, program control is routed to item 1354 which sends the EOC message to the CSC 320. Following this, or in the absence of a new channel state, program control is returned to the executive routine of FIG. 12a. If an end-of-call packet was not received, the routine next proceeds to decision 1356 which determines whether a device status update was received. An affirmative response from decision 1356 routes program control to item 1358 which updates the device status tables. Next, the routine proceeds to decision 1360 to determine whether a new device status exists. In the absence of a new device status, the routine proceeds to item 1362 where a device update block is built and sent via the serial link 206 to the TIMI 308. An affirmative response from decision block 1360 proceeds to item 1364 which sends the device status update to the CSC. Following this, program control is reverted to the executive routine of FIG. 12a.

While a particular embodiment of the invention has been described and shown, it should be understood that the invention is not limited thereto since many modifications can be made. It is therefore contemplated to cover the present application any and all such modifications which may fall within the true spirit and scope of the basic underlying principles disclosed and claimed herein.

What is claimed is:

1. An improved trunked communication system, comprising in combination:
   a plurality of trunked repeaters each capable of operating as a voice channel in a first mode, and at least one of which operates as a control channel in a second mode;
   a plurality of subscriber units each capable of operating on a discrete number of frequencies;
   a central controller for controlling said trunked repeater in response to inbound signalling words, and controlling said plurality of subscriber units via outbound signalling words;
   at least one console interface, coupled to a dispatcher console, said interface constructed and arranged to operate within a console network for providing communications between said console and any of said plurality of subscriber units via an assigned trunked repeater, and for transceiving channel call information; and
   means for interfacing said console network to said central controller to provide console interaction of the trunking system.

2. The system of claim 1, wherein said console network comprises:
   a time division multiplexed data bus;
   at least one system timer module, coupled to said data bus, for providing timing signals and data bus arbitration;
   a plurality of assignable transmit/receive modules each coupled to said data bus and to a selected one of said trunked repeaters; and
   at least one TOMI module coupled to said data bus and said console.

3. The system of claim 1, wherein said interfacing means comprises:
   a TCI coupled to said central controller for translating channel call information between said central controller and said console;
   a TIMI, coupled to said console network for maintaining communication between said console network and said central controller;
   a communication channel coupled to said TCI and said TIMI for communication channel call information.

4. The system of claim 3, which includes at least one redundant TIMI and communication channel.

5. In a trunked communication system having a central controller for transceiving channel call information from a plurality of subscriber units, and having a plurality of trunked repeaters, a console interface comprising:
   a TCI, operatively coupled to the central controller so as to become a part thereof, for translating channel call information between the central controller and at least one console which comprises a console network;
   a TIMI, operatively coupled to said console network so as to become a part thereof, for maintaining communication between said at least one console and the central controller in accordance with a predetermined signalling protocol; and
   a communication channel coupled to said TCI and said TIMI for communicating said channel call information.

6. The system of claim 5, which further includes at least one redundant TIMI and communication channel.

7. An improved trunked communication system, having a central controller for controlling a plurality of subscriber units and trunked repeaters, and having a time division multiplex console network having at least one dispatcher console, the improvement comprising:
- a TCI, operatively coupled to the central controller so as to become a part thereof, for translating channel call information between the central controller and at least one dispatcher console which comprises a console network;
- a TIMI, operatively coupled to said console network so as to become a part thereof, for maintaining communication between said console network and the central controller;
- a communication channel coupled to said TCI and said TIMI to enable communication between same; and
- at least one TOMI coupled respectively to said at least one dispatcher console to provide communication between said TIMI and said at least one dispatcher console.

8. An improved trunked communication system comprising:
- a plurality of subscriber units each capable of operating on a discrete number of frequencies;
- a plurality of trunked repeaters, each capable of operating as a voice channel in a first mode and as a control channel in a second mode;
- a receiver site controller for receiving channel call information from the trunked repeater selected as the control channel;
- a central site controller, for allocating use of said trunked repeaters operating as voice channels;
- a TCI, disposed between said receiver site controller and said central site controller for providing communication between same, and for translating channel call information between said central site controller and at least one dispatcher console;
- a time division multiplex data bus;
- a plurality of transmit/receive modules each coupled to said data bus and a selected one of said plurality of trunked repeaters to provide communication between said trunked repeaters and said dispatcher consoles;
- at least one system timer module, coupled to said data bus, for providing timing signals and data bus arbitration;
- at least one TIMI, coupled to said data bus for maintaining communication between said dispatcher consoles and said TCI;
- a communication channel disposed between said TIMI and said TCI;
- at least one TOMI, coupled to said data bus and said dispatcher consoles for providing communication between same;
- whereby, the dispatcher console communicates channel call information to the central site controller via the TIMI-TCI link, and monitors or participates in subscriber calls via the trunked repeater transmit receive module link.

9. A method for communicating data over a communication channel, comprising the steps of:
- (a) selecting a valid opcode byte from an opcode table;
- (b) appending a predetermined number of information bytes to said opcode byte selected in step (a);
- (c) generating an error byte in response to previous data communications;
- (d) appending said error byte to said information bytes;
- (e) calculating a checksum byte;
- (f) appending said checksum byte to said error byte; and
- (g) transmitting said opcode byte, information bytes, error byte and checksum byte over the channel.

10. In a trunked communication system having a central controller for transceiving channel call information from a plurality of subscriber units, and having a plurality of trunked repeaters, a console interface comprising:
- first interface means, operatively coupled to the central controller so as to become a part thereof, for communicating channel call information between the central controller and at least one console which comprises a console network;
- second interface means, operatively coupled to said at least one console so as to become a part of said console network, for maintaining communication between said console network and the central controller in accordance with a predetermined signalling protocol; and
- a communication channel coupled to said first and second interface means for communicating said channel call information.

* * * * *